(12) United States Patent
Kawasaki et al.

(10) Patent No.: US 10,785,632 B2
(45) Date of Patent: Sep. 22, 2020

(54) TERMINAL APPARATUS, CORE NETWORK APPARATUS, AND COMMUNICATION CONTROL METHOD

(71) Applicants: SHARP KABUSHIKI KAISHA, Sakai, Osaka (JP); FG Innovation Company Limited, Tuen Mun, New Territories (HK)

(72) Inventors: Yudai Kawasaki, Osaka (JP); Yoko Kuge, Osaka (JP); Shuichiro Chiba, Osaka (JP)

(73) Assignees: SHARP KABUSHIKI KAISHA, Sakai, Osaka (JP); FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 16/494,698

(22) PCT Filed: Mar. 14, 2018

(86) PCT No.: PCT/JP2018/010076
§ 371 (c)(1),
(2) Date: Sep. 16, 2019

(87) PCT Pub. No.: WO2018/168966
PCT Pub. Date: Sep. 20, 2018

(65) Prior Publication Data
US 2020/0092706 A1 Mar. 19, 2020

(30) Foreign Application Priority Data
Mar. 17, 2017 (JP) ................................ 2017-052492

(51) Int. Cl.
*H04W 4/00* (2018.01)
*H04W 8/02* (2009.01)
(Continued)

(52) U.S. Cl.
CPC ............. *H04W 8/02* (2013.01); *H04W 60/04* (2013.01); *H04W 84/042* (2013.01)

(58) Field of Classification Search
None
See application file for complete search history.

(56) References Cited

U.S. PATENT DOCUMENTS

| 5,287,551 A | 2/1994 | Gustafson, Jr. et al. |
| 2019/0053148 A1* | 2/2019 | Lee .................. H04W 48/08 |

(Continued)

OTHER PUBLICATIONS

3GPP TR 23.799 V14.0.0 (Dec. 2016); 3rd Generation Partnership Project; Technical Specification Group Services and System Aspects; Study on Architecture for Next Generation System (Release 14).
(Continued)

*Primary Examiner* — Khalid W Shaheed
(74) *Attorney, Agent, or Firm* — ScienBiziP, P.C.

(57) ABSTRACT

Provided is a communication measure for registering information about a terminal apparatus in various apparatuses, such as a control apparatus and a terminal apparatus, included in a communication system in which a protocol used for registration management or registration information management for a mobile communication service is shared, based on the states of the various apparatuses. Also provided is a communication control measure for updating the information about the terminal apparatus registered in the various apparatuses. Thus, there are provided, in a communication system in which a protocol used for registration management or registration information management for a mobile communication service is shared, a measure for registration management based on the states of various apparatuses included in the communication system, such as a control apparatus and a terminal apparatus, and a realization measure for determining post-registration behavior.

4 Claims, 15 Drawing Sheets

(51) Int. Cl.
*H04W 60/04* (2009.01)
*H04W 84/04* (2009.01)

(56) References Cited

U.S. PATENT DOCUMENTS

| 2019/0124561 | A1* | 4/2019 | Faccin | H04W 76/16 |
| 2019/0200285 | A1* | 6/2019 | Velev | H04W 8/08 |
| 2019/0261185 | A1* | 8/2019 | Velev | H04W 48/18 |
| 2019/0357129 | A1* | 11/2019 | Park | H04W 60/00 |
| 2019/0357130 | A1* | 11/2019 | Garcia Azorero | H04W 48/18 |

OTHER PUBLICATIONS

3GPP TS 23.501 V0.3.1 (Mar. 2017); 3rd Generation Partnership Project; Technical Specification Group Services and System Aspects; System Architecture for the 5G System; Stage 2 (Release 15).
3GPP Ts 23.502 V0.2.0 (Feb. 2017); 3rd Generation Partnership Project; Technical Specification Group Services and System Aspects; Procedures for the 5G System; Stage 2 (Release 15).
Huawei, et al., "Way forward w/NSSAI", Feb. 7, 2017, 3GPP SA WG2 Meeting #119, S2-170812.
3GPP TS 23.502 V0.2.0 (Feb. 2017); 3rd Generation Partnership Project;Technical Specification Group Services and System Aspects; Procedures for the 5G System; Stage 2(Release 15).
LG Electronics Inc., "Discussion on the handling of NSSAI", Feb. 7, 2017, 3GPP SA WG2 Meeting #119, S2-171049.
3GPP TR 33.899 V1.0.0 (Mar. 2017); 3rd Generation Partnership Project; Technical Specification Group Services and System Aspects; Study on the security aspects of the next generation system (Release 14).
3GPP TS 23.501 V0.3.0 (Feb. 2017); 3rd Generation Partnership Project; Technical Specification Group Services and System Aspects; System Architecture for the 5G System; Stage 2 (Release 15).
Samsung:"Registration procedure update considering network slicing": SAWG2 Meeting #119; S2-171152; Feb. 13-17, 2017 Dubrovnik, Croatia.
U.S. Appl. No. 62/472,954, filed Mar. 17, 2017, Applicant: Qualcomm Incorporated.

* cited by examiner

FIG. 5B

| IMSI |
|---|
| EMM State |
| GUTI |
| ME Identity |

FIG. 5C

| APN in Use |
|---|
| Assigned Session Type |
| IP Address(es) |
| Default Bearer |

FIG. 5D

| EPS Bearer ID |
|---|
| TI |
| TFT |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| NR node Address |
| NR node ID |
| WAG Address |
| WAG ID |

| APN in Use |
|---|
| Assigned Session Type |
| IP Address(es) |
| PGW F-TEID |
| SCEF ID |
| Default bearer |

FIG. 9D

| EPS Bearer ID |
|---|
| TI |
| TFT |
| SGW F-TEID |
| PGW F-TEID |
| MME F-TEID |
| eNB address |
| NR node address |
| WAG address |
| eNB ID |
| NR node ID |
| WAG ID |

FIG. 11B

| IMSI |
|---|
| ME Identity |
| MSISDN |
| MME F-TIED |
| SGW F-TIED |

FIG. 11C

| APN in Use (Data Network Identifier) |
|---|
| Assigned Session Type (Assigned PDN Type) |
| SGW F-TEID |
| PGW F-TEID |
| Default Bearer |
| IP Address(es) |

FIG. 11D

| EPS Bearer ID |
|---|
| TFT |
| PGW F-TEID |
| SGW F-TEID |
| eNB F-TEID |
| MME address |
| NR node address |
| WAG address |
| MME ID |
| NR node ID |
| WAG ID |

FIG. 12B

| IMSI |
|---|
| ME Identity |
| MSISDN |
| RAT type |

FIG. 12C

| APN in Use |
|---|

FIG. 12D

| Assigned Session Type |
|---|
| IP Address(es) |
| SGW F-TEID |
| PGW F-TEID |
| Default Bearer |

FIG. 12E

| EPS Bearer ID |
|---|
| TFT |
| SGW F-TEID |
| PGW F-TEID |

| User Identity |
|---|
| APN in Use |
| EPS Bearer ID |
| Serving Node Information |

FIG. 13B

TERMINAL APPARATUS, CORE NETWORK APPARATUS, AND COMMUNICATION CONTROL METHOD

TECHNICAL FIELD

The present invention relates to a terminal apparatus, a core network apparatus, and a communication control method. This application claims priority based on JP 2017-52492 filed on Mar. 17, 2017 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is system architecture of the Long Term Evolution (LTE). The 3GPP is in the process of creating specifications for the Evolved Packet System (EPS), which realizes an all-Internet Protocol (IP) architecture. Note that a core network constituting the EPS is called an Evolved Packet Core (EPC).

In recent years, the 3GPP has been discussing next generation communication technology and system architecture for the 5th Generation (5G) mobile communication system, a next generation mobile communication system. In these discussions, Architecture and Security for Next Generation System (NextGen) have been discussed as next generation communication technologies. Furthermore, the 3GPP standardizes 5G System (5GS) as a system for realizing the 5G mobile communication system. In the 5GS, technical problems for connecting various terminals to a cellular network have been identified to standardize solutions.

For example, requirement conditions include optimization and diversification of a communication procedure to register information of the terminal, optimization and optimization of a communication procedure for information management of the terminal, and optimization of the system architecture associated with optimization and diversification of a communication procedure, and the like, in connecting a great variety of terminals to a cellular network.

CITATION LIST

Non Patent Literature

NPL 1: 3GPP TR 23,799; Technical Specification Group Services and System Aspects; Study on Architecture for Next Generation System; (Release 14)

NPL 2: 3GPP TS 23.501; Technical Specification Group Services and System Aspects; System Architecture for the 5G System; Stage 2; (Release 15)

NPL 3: 3GPP TS 23,502; Technical Specification Group Services and System Aspects; Procedures for the 5G System; Stage 2; (Release 15)

SUMMARY OF INVENTION

Technical Problem

In the 5GS, sharing of registration management in the mobile communication service between a terminal apparatus and a network apparatus is discussed. More specifically, studies has been conducted to simplify registration management by sharing protocols used for registration information management for a terminal apparatus to an apparatus included in a core network, including initial registration of terminal apparatus information with the apparatus included in the core network to which the terminal apparatus is registered, updating registration information due to mobility of the terminal apparatus, and updating periodic registration information.

However, means for registration management based on the state of the terminal apparatus and the network apparatus, means for determining the behavior after registration, and the like are not clear.

In light of the foregoing, an object of the present invention is to provide a measure for registration management based on a state of a terminal apparatus and a network apparatus, a measure for determining behavior after registration, and the like.

Solution to Problem

A terminal apparatus according the present invention includes: a transmission and/or reception unit configured to in a registration procedure, transmit a Registration request message including Single Network Slice Selection Assistance information (NSSAI) to an apparatus included in a core network, and receive a Registration reject message including information A for indicating that use of the NSSAI is prohibited, from the apparatus included in the core network; and a controller configured to store the NSSAI in a prohibition list, based on the information A, wherein the prohibition list is a list in which one or more prohibited NSSAI are stored.

An apparatus included in a core network according to the present invention includes a transmission and/or reception unit configured to in a registration procedure, receive a Registration request message including Single Network Slice Selection Assistance information (NSSAI) from a terminal apparatus, and transmit a Registration reject message including information A for indicating that use of the NSSAI is prohibited, to the terminal apparatus; and a controller.

A communication control method for a terminal apparatus according to the present invention includes the steps of: in a registration procedure, transmitting a Registration request message including Single Network Slice Selection Assistance information (NSSAI) to an apparatus included in a core network; receiving a Registration reject message including information A for indicating that use of the NSSAI is prohibited, from the apparatus included in the core network; and storing the NSSAI in a prohibition list, based on the information A, wherein the prohibition list is a list in which one or more prohibited NSSAI are stored.

A communication control method for an apparatus included in a core network according to the present invention includes the steps of: in a registration procedure, receiving a Registration request message including Single Network Slice Selection Assistance information (NSSAI) from a terminal apparatus; and transmitting a Registration reject message including information A for indicating that use of the NSSAI is prohibited, to the terminal apparatus.

Advantageous Effects of Invention

According to the present invention, a terminal apparatus and each apparatus in the core network can register information of the terminal apparatus to various apparatuses, based on the state of various types of apparatuses including a control apparatus and the terminal apparatus included in a communication system, in the communication system in which registration management in a mobile communication service and protocols used for registration information management are shared, and can update the information of the terminal apparatus registered with various types of apparatuses.

BRIEF DESCRIPTION OF DRAWINGS

FIGS. 5B to 5D are diagrams illustrating a storage unit of the UE.

FIG. 8B is a diagram illustrating a storage unit of the MME/CPF/AMF.

FIGS. 9C and 9D are diagrams illustrating a storage unit of the MME/CPF/AMF.

FIGS. 11B to 11D are diagrams illustrating a storage unit of the SGW.

FIGS. 12B to 12E are diagrams illustrating a storage unit of the PGW/UPGW/SMF/UPF.

FIG. 13B is a diagram illustrating a storage unit of the SCEF.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. Embodiment 1.1. System Overview

Figure 1:
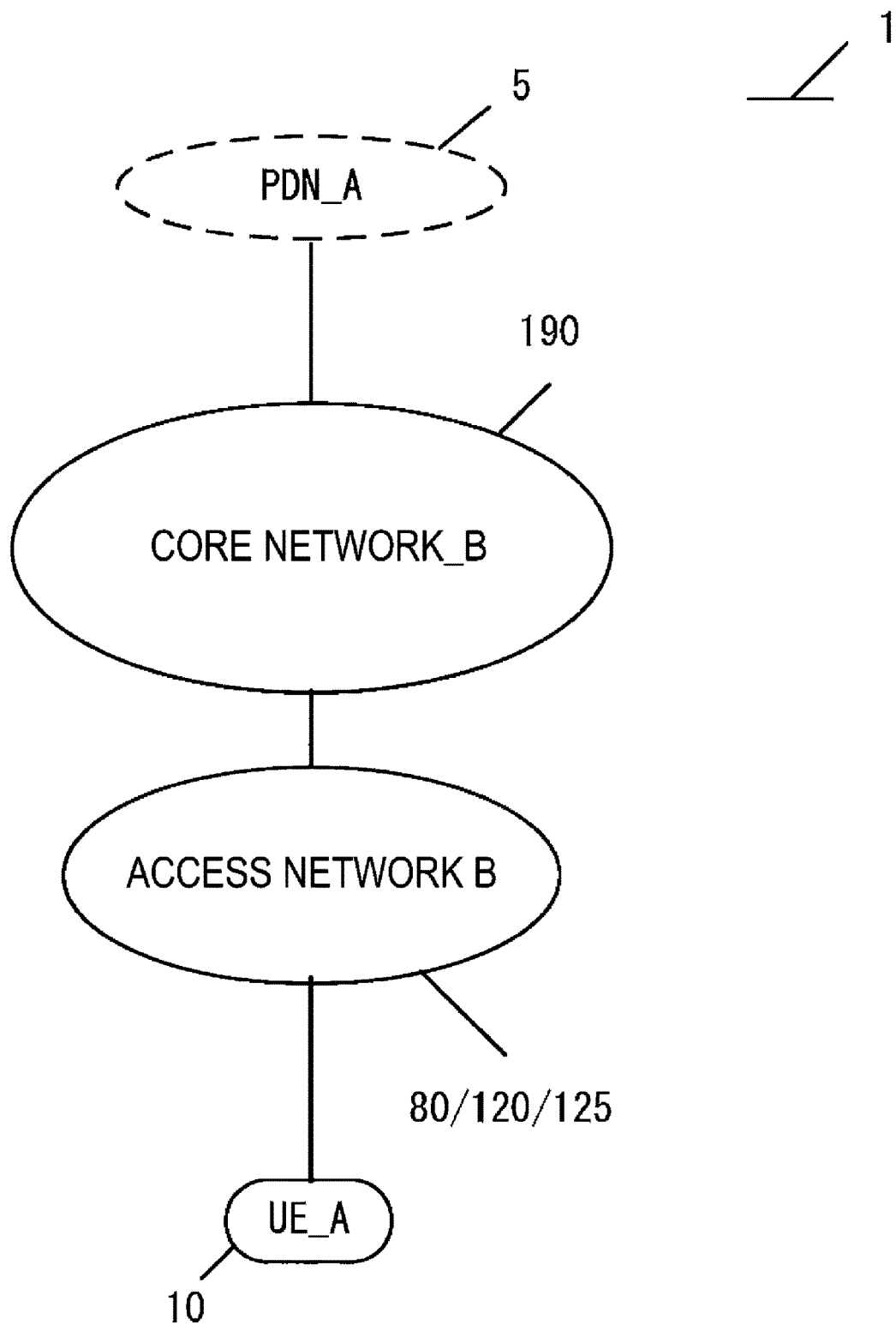
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE_A 10, an access network_B, a core network_B 190, and a Packet Data Network (PDN)_A 5. Here, the UE_A 10 may be any wirelessly connectable terminal apparatus, and may be a User Equipment (UE), a Mobile Equipment (ME), a Mobile Station (MS), a Cellular Internet of Things (CIoT) terminal (CIoT UE), or the like. Furthermore, a core network may be the core network_B 190, and an access network may be the access network_B. Furthermore, the core network may be a core network apparatus. Alternatively, in the present embodiment, the core network apparatus may be each apparatus included in the core network_B 190 and/or an apparatus that performs some or all of the processing or functions of each apparatus. The access network_B may be an access network in a 5G mobile communication system, or may be a NextGen RAN_A 120 and/or an E-UTRAN_A 80 and/or a WLAN ANc 125. Furthermore, the access network_A may be an access network in a 4G mobile communication system, or may be an E-UTRAN_A 80.

The UE_A 10 is capable of connecting to the access network and/or the core network. Furthermore, the UE_A 10 is capable of connecting to the PDNA_5 via the access network and/or the core network, and further transmits and/or receives user data to and/or from the PDN_A 5. Note that the user data may be data transmitted and/or received between the UE_A 10 and the PDN_A 5. Furthermore, transmission and/or reception (communication) of the user data may be performed using a Protocol Data Unit or Packet Data Unit (PDU) session, or using a Packet Data. Network Connection (PDN connection). Furthermore, the communication of the user data may not be limited to Internet Protocol (IP) communication, but may be non-IP communication.

Here, the PDU session or the PDN connection (hereinafter, also referred to as the PDN connectivity) is connectivity established between the UE_A 10 and the PDN_A 5 for providing a PDU connectivity service to transmit and/or receive the user data between the UE_A 10 and the PDN_A 5, or the like. To be more specific, the PDU session or the PDN connection may be connectivity established between the UE_A 10 and an external gateway. Here, the external gateway may be an apparatus connecting the core network such as a Packet Data Network Gateway (PGW)_A 30, a User Plane Gateway (UPGW)_A 130, and a Service Capability Exposure Function (SCEF)_A 46 with the PDN_A 5.

The PDU session or the PDN connection may be a communication path established for transmitting and/or receiving the user data between the UE_A 10 and the core network and/or PDN_A 5, or a communication path for transmitting and/or receiving the PDU. Furthermore, the PDU session or the PDN connection may be a session established between the UE_A 10 and the core network and/or PDN_A 5, or may be a logical communication path including a transfer path such as one or multiple bearers and the like between apparatuses in the mobile communication system 1. More specifically, the PDU session may be a connection established by the UE_A 10 with the core network_B 190 and/or the external gateway, a connection established between the UE_A 10 and the UPGW_A 130 or a UPF_A 235, or a connection such as a Packet Data Network Connection (PDN connection).

Note that the PDN connection may be connectivity and/or a connection between the UE_A 10 and the PGW_A 30 via an evolved Node B (eNB)_A 45 and/or a Serving Gateway (SGW)_A 35, or connectivity and/or a connection between the UE_A 10 and the SCEF_A 46 via the eNB_A 45 and/or a Mobility Management Entity (MME)_A 40. Furthermore, the PDU session may be connectivity and/or a connection between the UE_A 10 and the UPGW_A 130 or the UPF_A 235 via an NR node_A 122. Furthermore, the PDN connection may be identified by a PDN connection ID, and the PDU session may identified by a PDU session ID. Furthermore, the PDN connection and the PDU session may be identified by an EPS bearer ID.

Note that the UE_A 10 can transmit and/or receive the user data to and/or from an apparatus located in the PDN_A 5 such as an application server by using the PDU session or the PDN connection. In other words, the PDU session or the PDN connection can transfer the user data transmitted and/or received between the UE_A 10 and the apparatus located in the PDN_A 5 such as an application server. Furthermore, the apparatuses (the UE_A 10, apparatuses in the access network, and/or apparatuses in the core network) may associate the PDU session or the PDN connection with one or multiple pieces of identification information for management. Note that these pieces of identification information may include at least one of an Access Point Name (APN), a Traffic Flow Template (TFT), a session type, application identification information, identification information of the PDN_A 5, Network Slice Instance (NSI) identification information, and Dedicated Core Network (DCN) identification information, and access network identification information, or may further include another information. Furthermore, in a case that multiple PDU sessions or PDN connections are established, respective pieces of identification information associated with the PDU sessions or the PDN connections may have the same content or different contents. Furthermore, the NSI identification information may be information for identifying NSI, and may be an NSI ID or a Slice Instance ID below.

IP communication is a communication of data by using IP, and is data communication achieved through transmitting and/or receiving an IP packet which is given an IP header. Note that a payload section constituting an IP packet may contain the user data transmitted and/or received by the UE_A 10. Non-IP communication is a communication not using IP, and is data communication achieved through transmitting and/or receiving data which is not given an IP header. For example, non-IP communication may be the data communication achieved through transmitting and/or receiving application data not given the IP packet, or may transmit and/or receive the user data transmitted and/or received by the UE_A 10 to which another header such as a MAC header and an Ethernet (trade name) frame header is given.

Furthermore, the PDN_A 5 may be a Data Network (DN) to provide a communication service to the UE_A 10. Note that the DN may be configured as a packet data service network, or configured for each service. Furthermore, the PDN_A 5 may include a connected communication terminal. Therefore, connecting with the PDN_A 5 may be connecting with the communication terminal or a server apparatus located in the PDN_A 5. Furthermore, the transmission and/or reception of the user data to and/or from the PDN_A 5 may be transmission and/or reception of the user data to and/or from the communication terminal or server apparatus located in the PDN_A 5. Note that the PDN_A 5 may be represented by the DN, or the DN may be represented by the PDN_A 5.

Furthermore, the access network is a radio network connecting with the UE_A 10 and/or the core network. The access network may be a 3GPP access network, or a non-3GPP access network. Note that the 3GPP access network may be an Evolved Universal Terrestrial Radio Access Network (E-UTRAN)_A 80, and a Next Generation Radio Access Network (NextGen RAN)_A 120, and the non-3GPP access network may be an WLAN ANc 125. Note that the UE_A 10 may connect with the access network in order to connect to the core network, or may connect to the core network via the access network.

Furthermore, the core network is an IP mobile communication network run by a Mobile Network Operator to which the access network and/or the PDN_A 5 connects. The core network may be a core network for the mobile network operator that runs and manages the mobile communication system 1, or may be a core network for a virtual mobile network operator such as a Mobile Virtual Network Operator (MVNO) or a Mobile Virtual Network Enabler (MVNE), or a virtual mobile communication service provider. Note that the core network_B 190 may be an Evolved Packet Core (EPC) constituting an Evolved Packet System (EPS), may be a Next Generation (NextGen) Core (NGC) constituting a Next Generation System (NextGen System (NGS)), or may be a 5GS (5G System) constituting 5G Core Network (5GC). Furthermore, the core network_B 190 may be a core network for a system providing the 5G communication service. Note that the core network_B 190 is not limited to that above described, but may be a network for providing a mobile communication service. Note that the EPS may be a system for realizing the 4G mobile communication system. Furthermore, the 5GS and/or NGS may be a system for realizing the 5G mobile communication system.

Figure 3A:
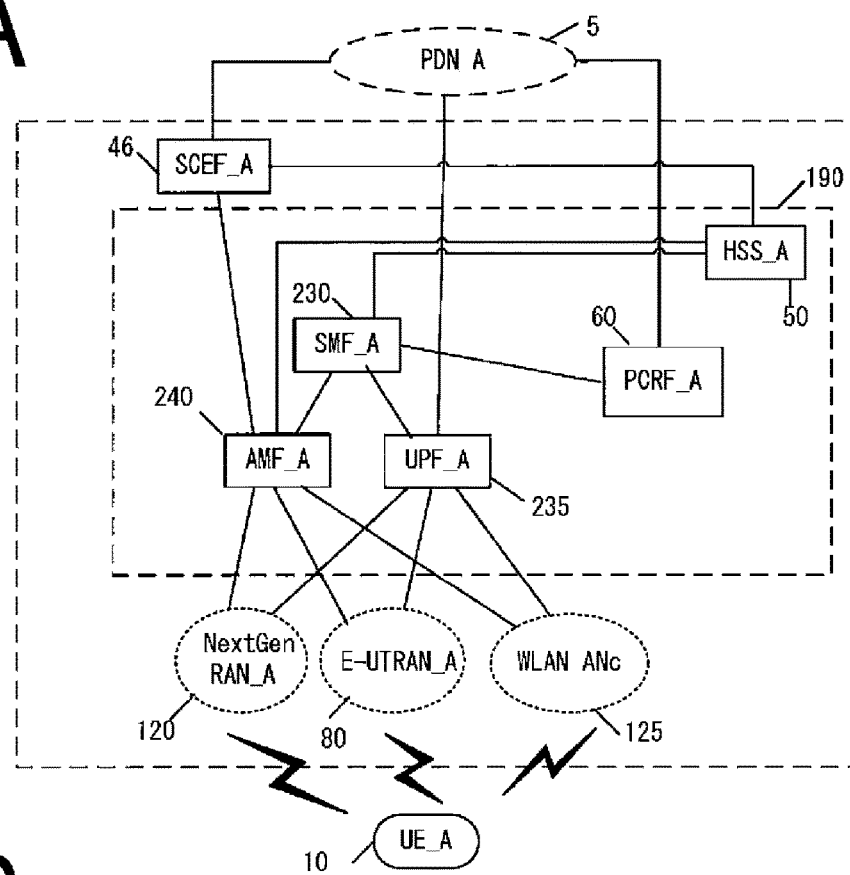
FIGS. 3A and 3B are diagrams illustrating an example of a configuration or the like of a core network and an access network in the mobile communication system.
Figure 3B:
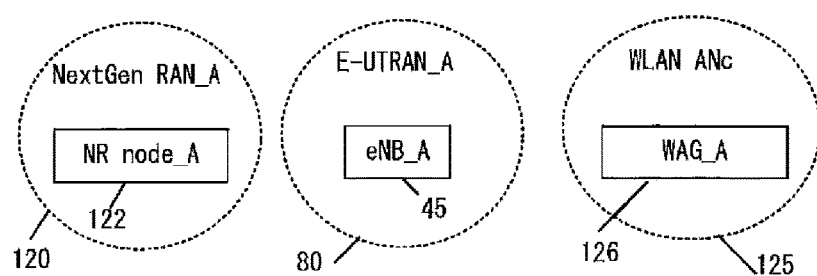

Next, an example of a configuration of the core network_B 190 will be described. An example of a configuration of the core network_B 190 will be described. FIGS. 3A and 3B illustrate an example of the configuration of the core network_B 190. The core network_B 190 in FIG. 3A includes an HSS_A 50, a PCRF_A 60, a Session Management Function (SMF)_A 230, the User Plane Function (UPF)_A 235, an Access and Mobility Management Function (AMF)_A 240, and the SCEF_A 46.

Note that the SMF_A 230 and/or the AMF_A 240 may be a Control Plane Function (CPF)_A 140, and the UPF_A 235 may be a User Plane Gateway (PGW)_A 130. Accordingly, the SMF_A 230 and/or the AMF_A 240 may be expressed as the CPF_A 140, and the CPF_A 140 may be expressed as the SMF_A 230 and/or the AMF_A 240. Furthermore, the UPF_A 235 may be expressed as the UPGW_A 130, and the UPGW_A 130 may be expressed as the UPF_A 235. The core network_B 190 is capable of connecting to multiple radio access networks (E-UTRAN_A 80, NextGen RAN_A 120, and WLAN ANc 125). Such a radio access network may be configured to connect to multiple different access networks, or may be configured to connect to either one of the access networks. Moreover, the UE_A 10 is capable of wirelessly connecting to the radio access network.

Furthermore, the E-UTRAN_A 80 and the NextGen RAN_A 120 can be configured as access networks connectable in a 3GPP access system. The WLAN access network c (WLAN ANc 125) that connects to the CPF_A 140 or the AMF_A 240 and the UPGW_A 130 or the UPF_A 235 can be configured as an access network connectable in the WLAN access system. Each apparatus will be described briefly hereinafter.

The UPGW_A 130 or the UPF_A 235 is an apparatus connected to the PDN_A 5 and the CPF_A 140, or the SMF_A 230, the E-UTRAN 80, the NextGen RAN_A 120, and the WLAN ANc 125, and serves as a relay device configured to transfer the user data by functioning as a gateway between the PDN_A 5 and/or DN and the core network_B 190. Note that the UPGW_A 130 or the UPF_A 235 may serve as a gateway for IP communication and/or non-IP communication. The UPGW_A 130 or the UPF_A 235 may have a function to transfer IP communication, or may have a function to convert between non-IP communication and IP communication. Note that multiple gateways like this may be located in the core network_B 190. Furthermore, the multiple gateways located may serve as gateways connecting the core network_B 190 with a single DN. Note that the UPGW_A 130 or the UPF_A 235 may have connectivity with another NF to connect to each apparatus via another NF. Note that the UPGW_A 130 or UPF_A 235 may be the SGW_A 35 and/or the PGW_A 30.

The PGW_A 30 is connected to the PDN_A 5, the SGW_A 35, and the PCRF_A 60, and serves as a relay device configured to transfer user data by functioning as a gateway between the PDN_A 5 and/or DN and the core network_B 190. Note that the PGW_A 30 may serve as a gateway for IP communication and/or non-IP communication.

The PGW_A 30 may have a function to transfer IP communication, or may have a function to convert between non-IP communication and IP communication. Note that multiple gateways like this may be located in the core network_B 190. Furthermore, the multiple gateways located may serve as gateways connecting the core network_B 190 with a single DN.

Note that a User Plane (U-Plane) may be a communication path for transmitting and/or receiving the user data, and may be configured to include multiple bearers. Furthermore, a Control Plane (C-Plane) may be a communication path for transmitting and/or receiving a control message, and may be configured with multiple bearers.

The PGW_A 30 may be connected to an UP function and a Policy function, or may be connected to the UE_A 10 via the U-Plane. Moreover, the PGW_A 30 may be configured integrally with the UPGW_A 130 or the UPF_A 235.

The SGW_A 35 is connected to the PGW_A 30, the MME_A 40, and the E-UTRAN_A 80, and serves as a relay device configured to transfer user data by functioning as a gateway between the core network_B 190 and the 3GPP access network (the E-UTRAN_A 80, the NextGen RAN_A 120).

The SGW_A 35 may be an UP function which has a contact with the access network and transfers the user data, or may be the User Plane Gateway (UPGW)_A 130 that is a gateway for transferring the user data between the access network and the core network.

The CPF_A 140 is an apparatus connected to the UPGW_A 130 or the UPF_A 235, the E-UTRAN_A 80, the NextGen RAN_A 120, the WLAN ANc 125, the HSS_A 50, and the SCEF_A 46. The CPF_A 140 may be an NF serving the mobility management of the UE_A 10 or the like, an NF serving the session management of the PDU session, or an NF managing one or multiple NSIs. The CPF_140 may be an NF serving one or multiple of these roles. Note that the NF may be one or multiple apparatuses located in the core network_B 190, a Control Plane Function or Control Plane Network Function (CP function) for the control information and/or control message, or a common CP function (Common Control Plane Network Function (Common CPNF), CCNF) shared between multiple NSIs. Note that the CPF_A 140 may have connectivity with another NE to connect to each apparatus via another NF. Note that CPF_A 140 may be the MME_A 40 or an NF with AMF_A 240 and SMF_A 230 functions.

The AMF_A 240 is an apparatus connected to the SMF_A 230, the E-UTRAN_A 80, the NextGen RAN_A 120, the WLAN ANc 125, the HSS_A 50, and the SCEF_A 46. The AMF_A 240 may be an NF serving mobility management of the UE_A 10 or the like, or an NF managing one or multiple NSIs. The AMF_A 240 may be an NF serving one or multiple of these roles. Note that the NF may be one or multiple apparatuses located in the core network_B 190, a Control Plane Function or Control Plane Network Function (CP function) for the control information and/or control message, or a common CP function (Common Control Plane Network Function (Common CPNF), CCNF) shared between multiple NSIs. Note that the AMF_A 240 may have connectivity with another NF to connect to each apparatus via another NF. Note that the AMF_A 240 may be an NF with some functions of the functions of the CPF_A 140.

Furthermore, the SMF_A 230 is an apparatus connected to the AMF_A 240, the UPF_A 235, the HSS_A 50, and the PCRF_A 60. The SMF_A 230 may be an NF serving session management, such as a PDU session. Note that the NF may be one or multiple apparatuses located in the core network_B 190, a Control Plane Function or Control Plane Network Function (CP function) for the control information and/or control message, or a common CP function (Common Control Plane Network Function (Common CPNF), CCNF) shared between multiple NSIs. Note that the SMF_A 230 may have connectivity with another NF to connect to each apparatus via another NF. Note that the SMF_A 230 may be an NF with some functions of the functions of the CPF_A 140.

The MME_A 40 is connected to the SGW_A 35, the access network, the HSS_A 50, and the SCEF_A 46, and is a control apparatus that performs location information management including mobility management and access control for the UE_A 10 via the access network. The MME_A 40 may further include a function as a session management apparatus to manage a session established by the UE_A 10.

Multiple control apparatuses like this may be located in the core network_B 190, and, for example, a location management device different from the MME_A 40 may be configured. The location management device different from the MME_A 40 may be connected with the SGWA_35, the access network, the SCEF_A 46, and the HSS_A 50, similar to the MME_A 40.

Furthermore, in a case that multiple MMEs are included in the core network_B 190, the MMEs may be connected to each other. With this configuration, the context of the UE_A 10 may be transmitted and/or received between the MMEs. In this way, the MME_A 40 is a management apparatus to transmit and/or receive the control information concerning the mobility management and session management to and/or from the UE_A 10, and in other words, may be a control apparatus for a Control Plane (C-Plane; CP).

The example is described in which the MME_A 40 is configured to be included in the core network_B 190, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be run by a single network operator, or different network operators respectively.

The MME_A 40 may be a relay device configured to transfer user data as a gateway between the core network_B 190 and the access network. Note that the user data transmitted and/or received by MME_A 40 as a gateway may be small data.

The MME_A 40 may be an NF serving the mobility management of the UE_A 10 or the like, an NE serving the session management of the PDU session or the like, or an NF managing one or multiple NSIs. The MME_A 40 may be an NF serving one or multiple of these. Note that the NE may be one or multiple apparatuses located in the core network_B 190, a CP function (hereinafter, also referred to as a Control Plane Function (CPF) or a Control Plane Network Function) for the control information and/or control message, or a common CP function shared between multiple NSIs.

Here, the NE is a processing function configured in a network. Specifically, the NF may be a function apparatus such as the MME, the SGW, the PGW, the CPF, and the UPGW, or may be a function such as Mobility Management (MM) and Session Management (SM), or capability information. The NF may be a function apparatus to realize a single function, or a function apparatus to realize multiple functions. For example, an NF to realize the MM function and an NF to realize the SM function may be separately present, or an NF to realize both the MM function and the SM function may be present.

The SCEF_A 46 is connected to the PDN_A 5 and the CPF_A 140, or AMF_A 240 or the MME_A 40 and the HSS_A 50, and is a relay device configured to transfer the user data as a gateway interfacing the PDN_A 5 and/or the DN and the core network_B 190. Note that the SCEF_A 46 may serve as a gateway for non-IP communication. The SCEF_A 46 may have a function to convert between non-IP communication and IP communication. Multiple gateways like this may be located in the core network_B 190. Furthermore, multiple gateways connecting the core network_B 190 with a single PDN_A 5 and/or DN may be also located. Note that the SCEF_A 46 may be configured outside or inside the core network.

The HSS_A 50 is connected to the MME_A 40 or the AMF_A 240 or the SMF_A 230 and the SCEF_A 46, and is a managing node configured to manage subscriber information. The subscriber information of the HSS_A 50 is referred to during the access control by the MME_A 40, for example. Moreover, the HSS_A 50 may be connected to the location management device different from the MME_A 40. For example, the HSSA_A 50 may be connected to the CPF_A 140 or the AMF_A 240 or the SMF_A 230. The HSS_A 50 may be Unified Data Management (UDM).

The PCRF_A 60 is connected to the UPGW_A 130 or the SWF_A 230 or the PGW_A 30 and the PDN_A 5, and is configured to perform QoS management on data delivery. For example, the PCRF_A 60 manages QoS of a communication path between the UE_A 10 and the PDN_A 5. The PCRF_A 60 may be an apparatus to create and/or manage a Policy and Charging Control (PCC) rule used by each apparatus for transmitting and/or receiving the user data and/or a routing rule.

The PCRF_A 60 may be a Policy function to create and/or manage a policy. To be more specific, the PCRF_A 60 may be connected to the UP function. The PCRF_A 60 may be Policy function (PCF).

As illustrated in FIG. 3B, each radio access network includes apparatuses to which the UE_A 10 is actually connected (such as a base station apparatus and an access point apparatus), and the like. The apparatuses used in these connections can be thought as apparatuses adapted to the radio access networks.

In the present embodiment, the E-UTRAN_A 80 is an access network for the Long Term Evolution (LTE) and is configured to include the eNB_A 45. The eNB_A 45 is a radio base station to which the UE_A 10 connects through an Evolved Universal Terrestrial Radio Access (E-UTRA), and the E-UTRAN_A 80 may be configured to include one or multiple eNBs_A 45. Furthermore, the multiple eNBs may be connected to each other.

The NextGen RAN_A 120 is a 5G access network, and is configured to include a New Radio Access Technology node (NR node) A 122. The NR node_A 122 is a radio base station to which the UE_A 10 connects through the Next Generation Radio Access (NextGen RA), and the NextGen RAN_A 120 may be configured to include one or multiple NR nodes_A 122. Note that in a case that the NextGen RAN_A 120 includes multiple NR node_A 122, the NextGen RAN_A 120 may include an NR node_A 122 and an NR node_B 123.

In this case, the NR node_B 123 may be the same configuration as the NR node_A 122.

The NextGen RAN_A 120 may be an access network configured to include the E-UTRA and/or the NextGen RA. In other words, the NextGen RAN_A 120 may include the eNB_A 45, the NR node_A 122, or both the eNB_A 45 and the NR node_A 122. In this case, the eNB_A 45 and the NR node_A 122 may be the same apparatuses. Therefore, the NR node_A 122 can be substituted with the eNB_A 45.

Note that the NextGen RAN_A 120 may be a 5G Radio Access Network (5G-RAN) or may be a 5G Access Network (5G-AN). In other words, the NextGen RAN_A 120 may be expressed as the 5G-RAN and/or the 5G-AN, or the 5G-RAN and/or the 5GN-AN may be expressed as the NextGen RAN_A 120.

The NR node_A 122 may be a gNB. In other words, the NR node_A 122 may be expressed as a gNB, and a gNB may be expressed as the NR node_A 122.

The WLAN ANc 125 is a radio LAN access network, and is configured to include a WAG_A 126. The WLAN Access Gateway (WAG)_A 126 is a radio base station to which the UE_A 10 connects through a radio LAN access, and the WLAN ANc 125 may be configured to include one or multiple WAGs_A 126. The WAG_A 126 may serve as a gateway between the core network_B 190 and the WLAN ANc 125. The WAG_A 126 may have a function unit for the radio base station and a function unit for the gateway which are configured as different apparatuses.

Note that herein, the UE_A 10 being connected to each radio access network refers to that the UE_A 10 is connected to a base station apparatus, an access point, or the like included in the radio access network, and data, signals, and the like transmitted and/or received also pass through the base station apparatus, the access point, or the like. Note that the control message transmitted and/or received between the UE_A 10 and the core network_B 190 may be the same control message independently from a type of the access network. Therefore, the UE_A 10 and the core network_B 190 transmitting and/or receiving a message to and/or from each other via the NR node_A 122 may mean the same thing as that the UE_A 10 and the core network_B 190 transmit and/or receive a message to and/or from each other via the eNB_A 45 and/or WAG_A 126.

1.2. Apparatus Configuration

First, a description is given of the identification information stored in each apparatus. International Mobile Subscriber Identity (IMSI) is permanent identification information of a subscriber (user), and is identification information assigned to a user using the UE. The IMSI stored by the UE_A 10 and the MME_A 40/CPF_A 140/AMF_A 2400 and the SGW_A 35 may be the same as the IMSI stored by the HSS_A 50.

EMM State/MM State indicates a Mobility management mode of the UE_A 10 or the MME_A 40/CPF_A 140/AMF_A 240. For example, the EMM State/MM State may be EMM-REGISTERED mode (registered mode) in which the UE_A 10 is registered to the network and/or EMM-DEREGISTERD mode (deregistered mode) in which the UE_A 10 is not registered to the network. The EMM State/MM State may be ECM-CONNECTED mode in which a connection is held between the UE_A 10 and the core network and/or ECM-IDLE mode in which the connection is released. Note that the EMM State/MM State may be information capable of distinguishing a mode that the UE_A 10 is registered in the EPC from a mode that the UE_A 10 is registered in the NGC or the 5GC.

Globally Unique Temporary Identity (GUTI) is temporary identification information about the UE_A 10. The GUTI includes identification information on the MME_A 40/CPF_A 140/AMF_A 240 (Globally Unique MME identifier (GUMMEI)) and identification information on the UE_A 10 in a specific MME_A 40/CPF_A 140/AMF_A 240 (M-Temporary Mobile Subscriber Identity (M-TMSI)). ME Identity is an ID of the UE_A 10 or ME, and may be International Mobile Equipment identity (IMEI) or IMEI Software Version (IMEISV), for example. MSISDN represents a basic phone number of the UE_A 10. The MSISDN stored by the MME_A 40/CPF_A 140/AMF_A 240 may be information indicated by a storage unit of the HSS_A 50. Note that the GUTI may include information identifying the CPF_140.

MME F-TEID is information identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. The IP address of the MME_A 40/CPF_A 140/AMF_A 240 and the TEID of the MME_A 40/CPF_A 140/AMF_A 240 may be stored independently. The MME F-TEID may be identification information for user data, or identification information for control information.

SGW F-TEID is information identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently from each other. The SGW F-TEID may be identification information for user data, or identification information for control information.

PGW F-TEID is information identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. The IP address of the PGW_A 30/UPGW_A 130/SMF_A 230/UPF_A 235 and the TEID of the PGW_A 30/UPGW_A 130; SMF_A 230/UPF_A 235 may be stored independently from each other. The PGW F-TEID may be identification information for user data, or identification information for control information.

eNB F-TEID is information identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently from each other. The eNB F-TEID may be identification information for user data, or identification information for control information.

The APN may be identification information identifying the core network and an external network such as the DN. The APN can be used also as information to select a gateway such as the PGW_A 30/UPGW_A 130/UPF_A 235 for connecting to the core networkA_90. Note that the APN may be Data Network Name (DNN). Therefore, the APN may be expressed as the DNN, and the DNN may be expressed as the APN.

Note that the APN may be identification information identifying such a gateway, or identification information identifying an external network such as the DN. Note that in a case that multiple gateways connecting the core network to the DN are located, multiple gateways selectable according to the APN may be provided. Moreover, one gateway may be selected from among such multiple gateways by another scheme using identification information other than the APN.

UE Radio Access Capability is identification information indicating a radio access capability of the UE_A 10. UE Network Capability includes an algorithm of security supported by the UE_A 10 and a key derivative function. MS Network Capability is information including one or multiple types of information necessary for the SGSN_A 42 to the UE_A 10 having the GERAN_A 25 and/or UTRAN_A 20 function. Access Restriction is registration information for access restriction. eNB Address is an IP address of the eNB_A 45. MME UE S1AP ID is information identifying the UE_A 10 in the MME_A 40/CPF_A 140/AMF_A 240. eNB UE S1AP ID is information identifying the UE_A 10 in the eNB_A 45.

APN in Use is an APN recently utilized. The APN in Use may be Data Network Identifier. This APN may be configured to include identification information about the network and identification information about a default operator. Furthermore, the APN in Use may be information identifying a DN with which the PDU session is established.

Assigned Session Type is information indicating a PDU session type. The Assigned Session Type may be Assigned PDN Type. The PDU session type may be an IP, or a non-IP. In a case that the PDU session type is an IP, information indicating a PDN type assigned by the network may be further included. Note that the Assigned Session Type may be IPv4, IPv6, or IPv4v6.

Unless otherwise specifically described, the IP Address refers to the IP address assigned to the LIE. The IP address may be an IP-v-4 address, an IPv6 address, or an IPv6 prefix. Note that in a case that the Assigned Session Type indicates a non-IP, an element of the IP Address may not be contained.

The UN ID is identification information identifying the core network_B 190 and an external network such as a DN. The DN ID can be used further as information for selecting a gateway such as the UPGW_A 130 or the PF_A 235 connecting to the core network_B 190.

Note that the DN ID may be identification information identifying such a gateway, or identification information identifying an external network such as the DN. Note that in a case that multiple gateways connecting the core network_B 190 to the DN are located, multiple gateways may be selectable according to the DN ID. Moreover, one gateway may be selected from among such multiple gateways by another scheme using identification information other than the DN ID.

The DN ID may be information equivalent to the APN, or different from the APN. Note that in a case that the DN ID is the information different from the APN, each apparatus may manage information indicating a correspondence relationship between the DN ID and the APN, perform a procedure to inquire the APN by using the DN ID, or perform a procedure to inquire the DN ID by using the APN.

SCEF ID is an IP address of the SCEF_A 46 used in the PDU session. Default Bearer is EPS bearer identification information, which is information acquired and/or generated in establishing a PDU session, for identifying a default bearer associated with the PDU session.

EPS Bearer ID is identification information on the EPS bearer. The EPS Bearer ID may be identification information identifying Signalling Radio Bearer (SRB) and/or Control-plane Radio bearer (CRB), or identification information identifying Data Radio Bearer (DRB). Transaction Identifier (TI) is identification information identifying a bidirectional message flow (Transaction). Note that the EPS Bearer ID may be EPS bearer identification information identifying a dedicated bearer. Therefore, the EPS bearer ID may be identification information identifying the EPS bearer different from the default bearer. The TFT indicates all the packet filters associated with the EPS bearer. The TFT is information identifying some pieces of the transmitted and/or received user data, and thus, the UE_A 10 uses the EPS bearer associated with the TFT to transmit and/or receive the user data identified by the TFT. Further in other words, the UE_A 10 uses Radio Bearer (RB) associated with the TFT to transmit and/or receive the user data identified by the TFT. The TFT may associate the user data such as the transmitted and/or received application data with a proper transfer path, and may be identification information identifying the application data. The UE_A 10 may use the default bearer to transmit and/or receive the user data which cannot be identified by the TFT. The UE_A 10 may store in advance the TFT associated with the default bearer.

The Default Bearer is the EPS bearer identification information identifying a default bearer associated with a PDU session. Note that the EPS bearer may be a logical communication path established between UE_A 10 and the PGWA_30/UPGW_A 130/UPF_A 235, or a communication path configuring a PDN connection/PDU session. The EPS bearer may be a default bearer, or a dedicated bearer. The EPS bearer may be configured to include an RB established between the UE_A 10 and the base station and/or access point in the access network. Furthermore, the RB and the EPS hearer may be associated with each other on a one-to-one basis. Therefore, identification information on the RB may be associated with the identification information on the EPS bearer on a one-to-one basis, or may be the same identification information as on the EPS bearer. Note that the RB may be an SRB and/or CRB, or a DRB. The Default Bearer may be information that the UE_A 10 and/or SGW_A 35 and/or PGW_A 30/UPGW_A 130/SMF_A 230/UPF_A 235 acquire from the core network in establishing a PDU session. Note that the default bearer is an EPS bearer established initially during the PDN connection/PDU session, and is an EPS bearer only one of which can be established in one PDN connection/PDU session. The default bearer may be an EPS bearer that can be used to communicate user data not associated with the TFT. The dedicated bearer is an EPS bearer established after a default bearer is established in the PDN connection/PDU session, and an EPS bearer multiple of which can be established in one PDN connection/PDU session. The dedicated hearer is an EPS bearer that can be used to communicate user data associated with TFT.

User Identity is information identifying a subscriber. The User Identity may be an IMSI, or a MSISDN. The User Identity may also be identification information other than an IMSI or MSISDN. Serving Node Information is information identifying the MME_A 40/CPF_A 140/AMF_A 240 used in a PDU session, and may be an IP address of the MME_A 40/CPF_A 140/AMF_A 240.

eNB Address is an IP address of the eNB_A 45. eNB ID is identification information identifying the UE in the eNB_A 45. MME Address is an IP address of the MME_A 40/CPF_A 140/AMF_A 240. MME ID is information identifying the MME_A 40/CPF_A 140/AMF_A 240. NR node Address is an IP address of the NR node_A 122. NR node ID is information identifying the NR node_A 122. WAG Address is an IP address of the WAG_A 126. WAG ID is information identifying the WAG_A 126.

The configuration of each apparatus will be described below. Note that some or all of apparatuses described below or functions of units in the apparatuses may operate on physical hardware, or logical hardware which is virtually configured on general-purpose hardware.

1.2.1. Configuration of UE

Figure 4A:
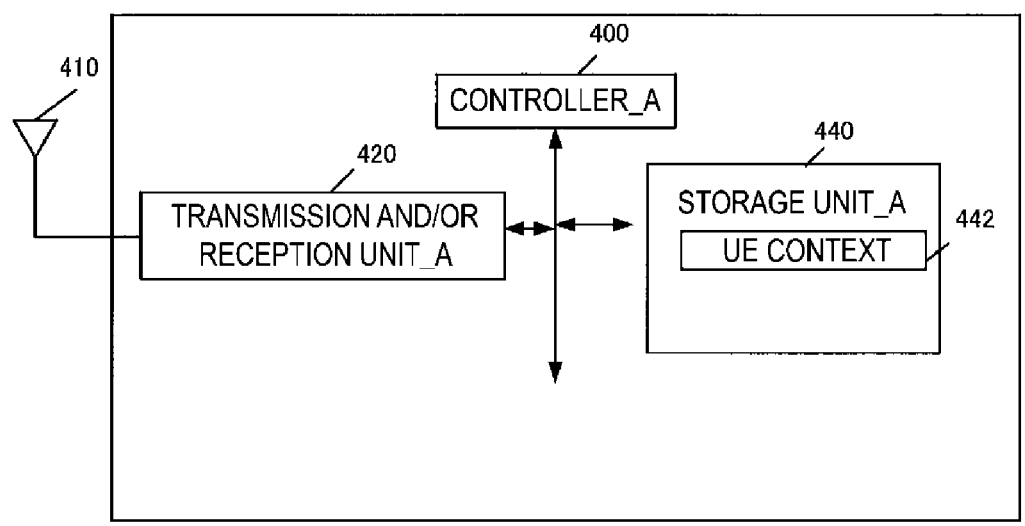
FIG. 4A is a diagram illustrating an apparatus configuration of a UE.

FIG. 4A illustrates an apparatus configuration of the UE_A 10. As illustrated in the drawing, the UE_A 10 includes a transmission and/or reception unit_A 420, a controller_A 400, and a storage unit_A 440. The transmission and/or reception unit_A 420 and the storage unit_A 440 are connected to the controller_A 400 via a bus. The controller_A 400 is a function unit to control the UE_A 10. The controller_A 400 implements various processes by reading out various programs stored in the storage unit_A 440 and performing the programs.

The transmission and/or reception unit_A 420 is a function unit through which the UE_A 10 connects to the base station in the access network and/or the access point to connect to the access network. An external antenna_A 410 is connected to the transmission and/or reception unit_A 420. In other words the transmission and/or reception unit_A 420 is a function unit through which the UE_A 10 connects to the base station in the access network and/or the access point. The transmission and/or reception unit_A 420 is a transmitting and/or receiving function unit through which the UE_A 10 transmits and/or receives the user data and/or control information to and/or from the base station in the access network and/or the access point.

The storage unit_A 440 is a function unit configured to store programs data, and the like necessary for each operation of the UE_A 10. The storage unit_A 440 includes, for example, a semiconductor memory, a Hard Disk Drive (HDD), or the like. The storage unit_A 440 may store at least identification information and/or control information and/or a flag and/or a parameter included in a control message which is transmitted and/or received in a communication procedure described later. As illustrated in the drawing, the storage unit_A 440 stores a UE context 442. Hereinafter, information elements stored in the storage unit_A 440 will be described. Note that the UE context 442 may include a UE context used to connect to the core network_B 190 and a UP context used to connect to the core network_B 190. The UE context used to connect to core network_B 190 and the UE context used to connect to the core network_B 190 may be stored together or separately.

First, FIG. 5B illustrates information elements included in the UE context stored for each UE. As illustrated in the drawing, the UE context stored for each UE includes IMSI, EMM State, GUTI, and ME Identity. Next, FIG. 5C illustrates the UE context for each PDU session or PDN connection stored for each PDU session or PDN connection. As illustrated in the drawing, the UE context for each PDU session includes APN in Use, Assigned Session Type, IP Address(es), and Default Bearer.

FIG. 5D illustrates the UE context for each bearer stored in the storage unit of the UE. As illustrated in the drawing, the UE context for each bearer includes EPS Bearer ID, TI, and TFT.

1.2.2. Configuration of cNB/NR Node/WAG

Figure 6A:
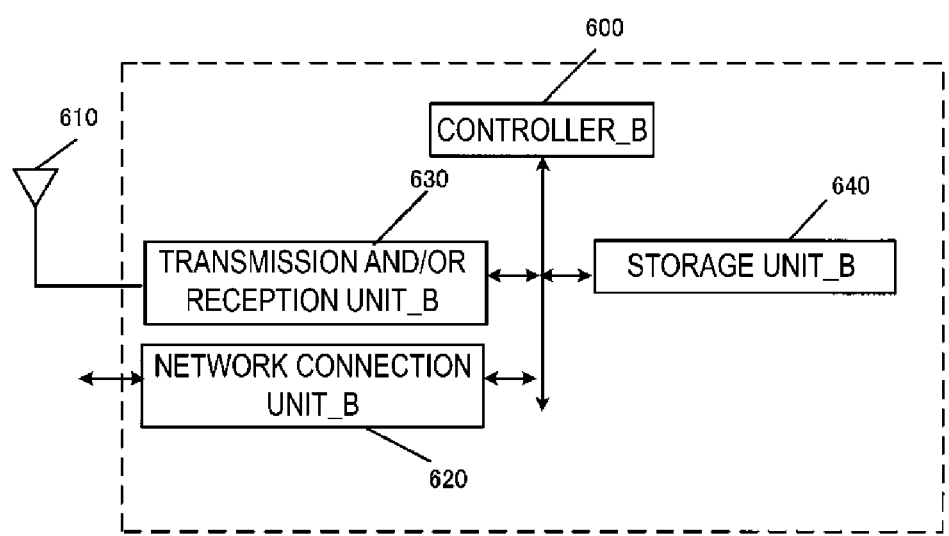
FIG. 6A is a diagram illustrating an apparatus configuration of an eNB/NR node/WAG.

A configuration of the eNB_A 45, the NR node_A 122, and the WAG_A 126 will be described below. FIG. 6A illustrates an apparatus configuration of the eNB_A 45, the NR node_A 122, and the WAG_A 126. As illustrated in the drawing, the eNB_A 45, the NR node_A 122, and the WAG_A 126 include a network connection unit_B 620, a transmission and/or reception unit_B 630, a controller_B 600, and a storage unit_B 640. The network connection unit_B 620, the transmission and/or reception unit_B 630, and the storage unit_B 640 are connected to the controller_B 600 via a bus.

The controller_B 600 is a function unit for controlling the eNE_A 45. The controller_B 600 implements various processes by reading out various programs stored in the storage unit_B 640 and performing the programs.

The network connection unit_B 620 is a function unit through which the eNB_A 45, the NR node_A 122, and the WAG_A 126 connect to the MME_A 40 and/or SGW_A 35. The network connection unit_B 620 is a transmission and/or reception unit through which the eNB_A 45, the NR node_A 122, and the WAG_A 126 transmit and/or receive the user data and/or control information to and/or from the MME_A 40 and/or the SGW_A 35.

The transmission and/or reception unit_B 630 is a function unit through which the eNB_A 45, the NR node_A 122, and the WAG_A 126 connect to the UE_A 10. Furthermore, the transmission and/or reception unit_B 630 is a transmitting and/or receiving function unit for transmitting and/or receiving the user data and/or control information to and/or from the UE_A 10. Furthermore, an external antenna_B 610 is connected to the transmission and/or reception unit_B 630.

The storage unit_B 640 is a function unit for storing programs, data, and the like necessary for each operation of the eNB_A 45, the NR node_A 122, and the WAG_A 126. The storage unit_B 640 includes, for example, a semiconductor memory, a HDD, or the like. The storage unit_B 640 may store at least identification information and/or control information and/or a flag and/or a parameter included in a control message which is transmitted and/or received in a communication procedure described later. The storage unit_B 640 may store these pieces of information as the contexts for each UE_A 10.

1.2.3. Configuration of MME/CPF/AMF

Figure 7A:
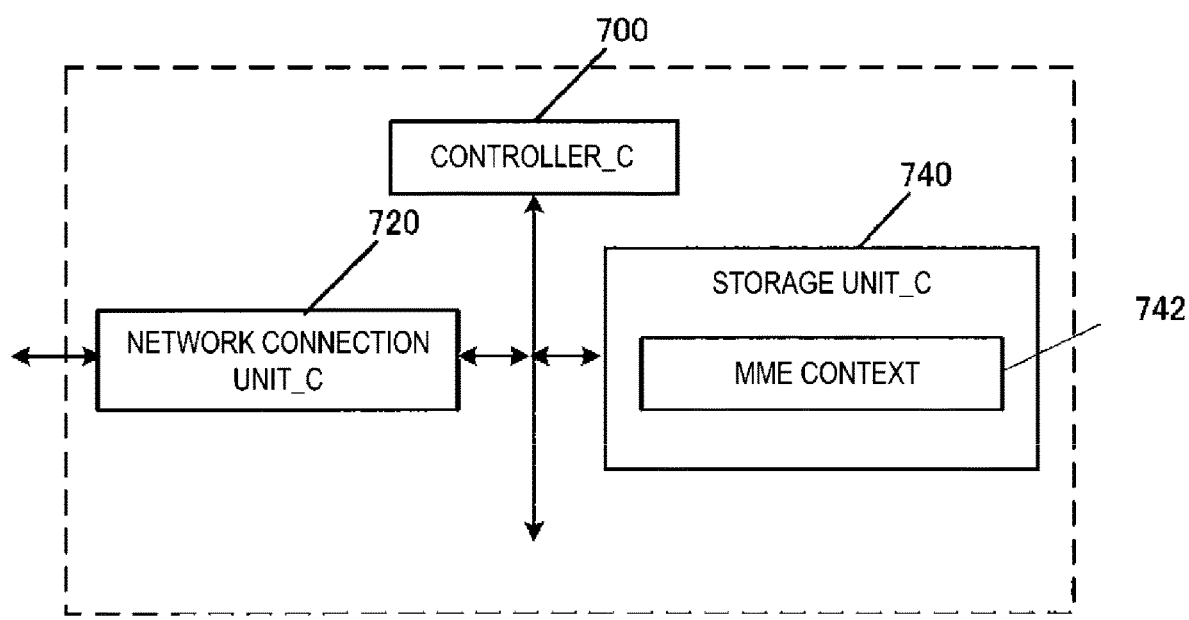
FIG. 7A is a diagram illustrating an apparatus configuration of an MME/CPF/AMF.

A configuration of the MME_A 40, the CPF_A 140, and AMF_A 240 will be described below. FIG. 7A illustrates an apparatus configuration of the MME_A 40, the CPF_A 140, and the AMF_A 240. As illustrated in the drawing, the MME_A 40, the CPF_A 140, and the AMF_A 240 include a network connection unit_C 720, a controller_C 700, and a storage unit_C 740. The network connection unit_C 720 and the storage unit_C 740 are connected to the controller_C 700 via a bus. Note that functions of these units may operate on physical hardware, or logical hardware which is virtually configured on general-purpose hardware.

The controller_C 700 is a function unit for controlling the MME_A 40, the CPF_A 140, and the AMF_A 240. The controller_C 700 implements various processes by reading out various programs stored in the storage unit_C 740 and performing the programs.

The network connection unit_C 720 is a function unit through which the MME_A 40 connects to the base station in the access network and/or the access point in the access network and/or the SCEF_A 46 and/or the HSS_A 50 and/or the SGW_A 35. The network connection unit_C 720 is further a transmission and/or reception unit through which the MME_A 40 transmits and/or receives the user data and/or control information to and/or from the base station in the access network and/or the access point in the access network and/or the SCEF_A 46 and/or the HSS_A 50 and/or the SGW_A 35.

The network connection unit_C 720 is a function unit through which the CPF_140 connects to the base station in the access network and/or the access point in the access network and/or the SCEF_A 46 and/or the HSS_A 50 and/or the UPGW_A 130 and/or the UPF_A 235 and/or the SWF_A 230. Furthermore, the network connection unit_C 720 is a transmission and/or reception unit through which the MME_A 40 transmits and/or receives the user data and/or control information to and/or from the base station in the access network and/or the access point in the access network and/or the SCEF_A 46 and/or the HSS_A 50 and/or the UPGW_A 130 and/or the UPF_A 235.

The storage unit_C 740 is a function unit for storing programs, data, and the like necessary for each operation of the MME_A 40, the CPF_A 140, and the AMF_A 240. The storage unit_C 740 includes, for example, a semiconductor memory, a HDD, or the like. The storage unit_C 740 may store at least identification information and/or control information and/or a flag and/or a parameter included in a control message which is transmitted and/or received in a communication procedure described later.

As illustrated in the drawing, the storage unit_C 740 stores an MME context 742. Hereinafter, information elements stored in the storage unit_C 740 will be described. Note that the MME context may be a storage context by the CPF_140. FIG. 8B illustrates information elements included in the UE context stored for each UE. As illustrated in the drawing, the MME context stored for each UE includes one or multiple pieces of IMSI, MSISDN, MM State, GUTI, ME Identity, UE Radio Access Capability, UE Network Capability, MS Network Capability, Access Restriction, MME F-TEID, SGW F-TEID, eNB Address, MME UE S1AP ID, eNB UE S1AP ID, NR node Address, NR node ID, WAG Address, and WAG ID.

Next, FIG. 9C illustrates the MME context for each PDU session or PDN connection stored for each PDU session or PDN connection. As illustrated in the drawing, the MME context for each PDU session includes APN in Use, Assigned Session Type, IP Address(es), PGW F-TEID, SCEF ID, and Default bearer.

FIG. 9D illustrates the MME context for each bearer stored for each bearer. As illustrated in the drawing, the MME context stored for each bearer includes one or multiple pieces of EPS Bearer ID, TI, TFT, SGW F-TEID, PGW F-TEID, MME F-TEID, eNB Address, NR node Address, WAG Address, eNB ID, NR node ID, and WAG ID. Here, the information elements included in the MME context illustrated in FIGS. 8B to 9D may be included in either the MM context or the EPS bearer context and stored.

1.2.4. Configuration of SGW

Figure 10A:
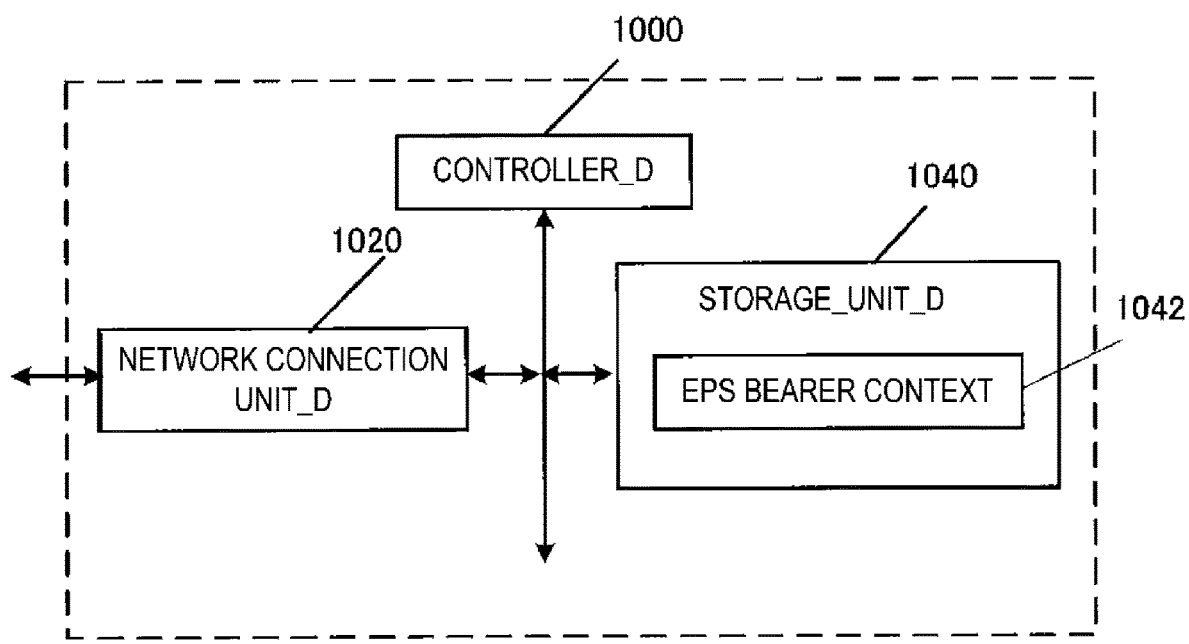
FIG. 10A is a diagram illustrating an apparatus configuration of an SGW/PGW/UPGW/SCEF/SMF/UPF.

FIG. 10A illustrates an apparatus configuration of the SGW_A 35. As illustrated in the drawing, the SGW_A 35 includes a network connection unit_D 1020, a controller_D 1000, and a storage unit_D 1040. The network connection unit_D 1020 and the storage unit_D 1040 are connected to the controller_D 1000 via a bus.

The controller_D 1000 is a function unit for controlling the SGW_A 35. The controller_D 1000 implements various processes by reading out various programs stored in the storage unit_D 1040 and performing the programs.

The network connection unit_D 1020 is a function unit through which the SGW_A 35 connects to the base station in the access network and/or the access point and/or MME_A 40 and/or PGW_A 30 and/or SGSN_A 42. Furthermore, the network connection unit_D 1020 is a transmission and/or reception unit through which the SGW_A 35 transmits and/or receives the user data and/or control information to and/or from the base station in the access network and/or the access point and/or the MME_A 40 and/or the PGW_A 30 and/or the SGSN_A 42.

The storage unit_D 1040 is a function unit for storing programs, data, and the like necessary for each operation of the SGW_A 35. The storage unit_D 1040 includes, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Note that the EPS bearer context 1042 includes an EPS bearer context stored for each UE, an EPS bearer context stored for each PDU session, and an EPS bearer context stored for each bearer.

First, FIG. 11B illustrates information elements of the EPS bearer context stored for each UE. As illustrated in the drawing, the EPS bearer context stored for each UE includes IMI, ME Identity, MSISDN, MME F-TEID and SGW F-TEID.

The EPS bearer context further includes an EPS bearer context for each PDU session stored for each PDU session. FIG. 11C illustrates the EPS bearer context for each PDU session. As illustrated in the drawing, the EPS bearer context for each PDU session includes APN in Use, Assigned Session Type, SGW F-TEID, PGW F-TEID, Default Bearer, and IP Address(es).

The EPS bearer context further includes an EPS bearer context for each bearer. FIG. 11D illustrates the EPS bearer context for each bearer. As illustrated in the drawing, the EPS bearer context for each bearer includes one or multiple pieces of EPS Bearer ID, TFT, PGW F-TEID, SGWF-TEID, eNB F-TEID, MME Address, NR node Address, WAG Address, MME ID, NR node ID, and WAG ID.

1.2.5. Configuration of PGW/UPGW/SMF/UPF

FIG. 10A illustrates an apparatus configuration of the PGW_A 30, the UPGW_A 130, the SMF_A 230, and the UPF_A 235. As illustrated in the drawing, the PGW_A 30, the UPGW_A 130, the SMF_A 230, and the UPF_A 235 include a network connection unit_D 1020, a controller_D 1000, and a storage unit_D 1040. The network connection unit_D 1020 and the storage unit_D 1040 are connected to the controller_D 1000 via a bus. Note that functions of these units may operate on physical hardware, or logical hardware which is virtually configured on general-purpose hardware.

The controller_D 1000 is a function unit for controlling the PGW_A 30. The controller_D 1000 implements various processes by reading out various programs stored in the storage unit_D 1040 and performing the programs.

The network connection unit_D 1020 is a function unit through which the PGW_A 30 connects to the SGW_A 35 and/or the PCRF_A 60 and/or the ePDG_A 65 and/or the AAA_A 55 and/or the TWAG_A 74 and/or the PDN_A 5. The network connection unit_D 1020 is a transmission and/or reception unit through which the PGW_A 30 transmits and/or receives the user data and/or control information to and/or from the SGW_A 35 and/or the PCRF_A 60 and/or the ePDG_A 65 and/or the AAA_A 55 and/or the TWAG_A 74 and/or the PDN_A 5.

The network connection unit_D 1020 is a function unit through which the UPGW_A 130 connects to the PCRF_A 60 and/or the NR node_A 122 and/or the PDN_A 5. The network connection unit_D 1020 is a transmission and/or reception unit through which the PGW_A 30 transmits and/or receives the user data and/or control information to and/or from the SGW_A 35 and/or the PCRF_A 60 and/or the ePDG_A 65 and/or the AAA_A 55 and/or the TWAG_A 74 and/or the PDN_A 5.

The network connection unit_D 1020 is a function unit through which the SMF_A 230 connects to the AMF_A 240 and/or the UPF_A 235 and/or the HSS_A 50 and/or the PCRF_A 60. The network connection unit_D 1020 is a transmission and/or reception unit through which the SMF_A 230 transmits and/or receives the control information to and/or from the AMF_A 240 and/or the UPF_A 235 and/or the HSS_A 50.

The network connection unit 1020 is a function unit through which the UPF_A 235 connects to the NR node A_122 and/or the SWF_A 230 and/or the PDN_A 5 and/or the DN_B 105. The network connection unit_D 1020 is a transmission and/or reception unit through which the UPF_A 235 transmits and/or receives the user data and/or control information to and/or from the NR node_A 122 and/or the SMF_A 230 and/or the PDN_A 5 and/or the DN_B 105.

The storage unit_D 1040 is a function unit for storing programs, data, and the like necessary for each operation of the PGW_A 30. The storage unit_D 1040 includes, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Note that the EPS bearer context 1042 may include an EPS bearer context stored for each UE, an EPS bearer context stored for each APN, an EPS bearer context stored for each PDU session or PDN connection, and an EPS bearer context stored for each bearer which may be separately stored in the EPS bearer context. The EPS hearer context may be further a context stored by the UPGW_A 130 and/or the SMF_A 230 and/or the UPF_A 235.

FIG. 12B illustrates information elements included in the EPS bearer context stored for each UE. As illustrated in the drawing, the EPS bearer context stored for each UE includes IMSI, ME Identity, MSISDN, and RAT type.

Next, FIG. 12C illustrates the EPS bearer context stored for each APN. As illustrated in the drawing, the EPS bearer context stored for each APN of the storage unit of the PGW includes APN in use. Note that the EPS bearer context stored for each APN may be stored for each Data Network Identifier.

FIG. 12D illustrates the EPS bearer context for each PDU session or PDN connection stored for each PDU session or PDN connection. As illustrated in the drawing, the EPS bearer context for each PDU session or PDN connection includes Assigned Session Type, IP Address(es), SGW PGW F-TEID, and Default Bearer.

FIG. 12E illustrates the EPS bearer context stored for each EPS bearer. As illustrated in the drawing, the EPS bearer context includes EPS Bearer ID, TFT, SGW F-TEID, and PGW F-TEID.

1.2.6. Configuration of SCEF

FIG. 10A illustrates an apparatus configuration of the SCEF_A 46. As illustrated in the drawing, the SCEF_A 46 includes a network connection unit_D 1020, a controller_D 1000, and a storage unit_D 1040. The network connection unit_D 1020 and the storage unit_D 1040 are connected to the controller_D 1000 via a bus.

The controller_D 1000 is a function unit for controlling the SCEF_A 46. The controller_D 1000 implements various processes by reading out various programs stored in the storage unit_D 1040 and performing the programs. The network connection unit_D 1020 is a function unit through which the SCEF_A 46 connects to the core network_B 190. In other words, the network connection unit_D 1020 is a function unit through which the SCEF_A 46 connects to the MME_A 40. The network connection unit_D 1020 is a transmission and/or reception unit through which the SCEF_A 46 transmits and/or receives the user data and/or control information to and/or from the MME_A 40.

The storage unit_D 1040 is a function unit for storing programs, data, and the like necessary for each operation of the SCEF_A 46. The storage unit_D 1040 includes, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Hereinafter, information elements stored in the storage unit_D 1040 will be described. FIG. 13B illustrates information elements included in the EPS bearer context. As illustrated in the drawing, the EPS bearer context includes User Identity, APN in Use, EPS Bearer ID, and Serving Node Information.

1.3. Description of Initial Procedure and/or Update Procedure

Next, before describing the detailed steps of initial procedure and/or update procedure in the present embodiment, in order to avoid redundant descriptions, terminology specific to the present embodiment and primary identification information used in each procedure will be described beforehand.

In the present embodiment, a network is an access network and/or the core network_B 190 and/or the PDN_A 5. The network may also indicate any apparatus included in the access network and/or the core network_B 190 and/or PDN_A 5. In other words, the network performing the transmission and/or reception of a message and/or processing means an apparatus in the network performing the transmission and/or reception of the message and/or processing.

A first DN in the present embodiment is a general DN. The DN may be a DN which is not a DN for the Mobile Edge Computing (MEC). Furthermore, the first DN can be a DN that is not a local DN, or may be a DN in which 3rd party services are hosted and which is located far from the UE_A 10's access point of attachment. Note that the first DN may be expressed as the PDN_A 5 or DN, and the PDN_A 5 may be expressed as the first DN or DN.

A second timer in the present embodiment is a backoff timer that indicates the initiation of the registration procedure and/or prohibition of the transmission of the Registration request message. While the second timer is running, the initiation of the registration procedure and/or transmission and/or reception of the Registration request message of each apparatus may be prohibited. Note that the time at which the second timer is running may be a time indicated by the value of the timer transmitted and/or received in the Registration accept message and/or the Registration reject message, or may be a time of preconfig.

A first state in the present embodiment is a state in which the UE_A 10 is not registered with the network. The first state may be a state in which effective position information or routing information are not included in the UE context in the AMF_A 240. In the first state, the UE_A 10 and the apparatus in the core network may or may not have a UE context, Note that the UE context may be a context by which a context is generated and/or held by the UE_A 10 and/or the apparatus in the core network. Furthermore, the apparatus in the core network may be the AMF_A 240 or may be the SMF_A 230. The first state may be a state in which the UE_A 10 can perform an initial registration procedure.

A second state in the present embodiment is a state in which the UE_A 10 is registered with the network. The second state may be a state in which the UE_A 10 can receive a service requesting registration from the network. Furthermore, the second state may be a state in which the UE_A 10 can perform a procedure for updating the Mobility Registration. Furthermore, the second state may be a state in which the registration procedure can be initiated again in a state in which the UE_A 10 has been registered with the network. Furthermore, the second state may be a state in which context in the UE_A 10 and/or core network has been established and/or generated, or a state in which the UE_A 10 and/or the apparatus in the core network holds the context.

Here, the registration procedure initiated again in a state in which the UE_A 10 has been registered with the network may be for the UE_A 10 to perform a registration procedure occurred for updating the capability information (capability) or re-negotiating the protocol parameter periodically or due to the UE_A 10 movement (mobility).

A third state in the present embodiment is after the UE_A 10 has initiated the initial registration procedure. Furthermore, the third state may be a state in which the UE_A 10 is waiting for a response from the network and/or AMF_A 240. Furthermore, the third state may be a state indicating that it is after the initial procedure has been initiated. In other words, the third state may be a state to which the apparatus in the UE_A 10 and/or core network in the first state transitions in a case that the registration procedure is initiated, or may be a state indicating that an initial registration has been started.

A fourth state in the present embodiment is after the registration procedure has been initiated again in a state in which the UE_A 10 has been registered with the network. Furthermore, the fourth state may be a state in which the UE_A 10 is waiting for a response from the network and/or AMF_A 240. Furthermore, the fourth state may be a state indicating that a procedure other than the initial procedure has been initiated. In other words, the fourth state may be a state in which the UF_A 10 and/or the apparatus in core network in the second state transitions in a case that a registration procedure is initiated again, or may be a state indicating that the registration has been started again.

The mobility restriction in the present embodiment is information that restricts movement (mobility) of UE_A 10 or access to service. The mobility restriction may include at least one of RAT restriction, forbidden area, and service area restriction. Alternatively, all of these pieces of information may be included.

Here, the "RAT restriction" refers to information indicating one or multiple Radio Access Technology (RAT) to which the UE_A 10 is not allowed to be connected. Note that in RAT indicated by the RAT restriction, the UE_A 10 may be in a state in which any communication with the network is prohibited or a state where communications other than a particular communication is restricted. Here, the particular communication may be, for example, an emergency communication or a transmission and/or reception of control information included in the initial registration procedure.

The "forbidden area" refers to information indicating a range in which the UE_A 10 is not allowed to communicate with the network in a particular RAT. The forbidden area may be information indicating a range in which the UE_A 10 is restricted or communications other than a particular communication is restricted in a particular RAT. Here, the particular communication may be, for example, an emergency communication or a transmission and/or reception of control information included in the initial registration procedure.

The Service area restriction is information including Allowed area and Non-allowed area. Note that the Allowed area may be information indicating a range in which communication between the U_A 10 and the network is possible in a particular RAT. Furthermore, the Non-allowed area may be information indicating a range in which a procedure for enabling communication between the UE_A 10 and the network is prohibited. Specifically, within the Non-allowed area, the UE_A 10 may be prohibited from initiating a Service Request procedure.

The registration area/cell in the present embodiment is information indicating one or multiple tracking areas or cells assigned to the UE_A 10. The registration area/cell may be information assigned by the AMF_A 240. The registration area/cell may be information assigned in consideration of the movement pattern of the UE and the service area restriction. Furthermore, the registration area/cell may be information indicating a current cell of the UE_A 10, or may be information indicating a current tracking area of the UE_A 10. Furthermore, the registration area may be stored for each access type, for example registration area for 3GPP connection and registration area for non-3GPP connection may be different information. Furthermore, the registration area/cell may be a tracking area.

A tracking area in the present embodiment is a singular or multiple ranges which the core network manages and can be represented by the location information of the UE_A 10. The tracking area may be configured to include multiple cells. The tracking area may be a range in which a control message such as paging is broadcast, or a range in which the UE_A 10 can move without a handover procedure. The tracking area may be a routing area, a location area, or those similar to them. Hereinafter, the tracking area may be Tracking Area (TA).

A TA list in the present embodiment is a list including one or more TAs which the network has assigned to the UE_A 10. Note that the UE_A 10 may be able to move without performing the tracking area update procedure while moving within one or more TAs included in the TA list. In other words, for the UE_A 10, the TA list may be a group of information indicating an area in which the UE_A 10 can move without performing the tracking area update procedure.

The Network Slice Instance (NSI) in the present embodiment is an entity of each of one or multiple Network Slices configured in the core network_B 190. The NSI in the present embodiment may be configured to include a virtual Network Function (NF) generated using a Network Slice Template (NST). Here, the NST is associated with a resource request for providing a required communication service or capability, and is a logical expression of one or multiple Network Functions (NFs).

Specifically, the NSI may be an aggregation including multiple NFs in the core network_B 190. The NSI may be a logical network configured to classify the user data delivered through a service or the like. The network slice may be configured to include at least one or more NFs. The NF included in the network slice may be or may not be an apparatus shared by another network slice.

The UE_A 10 and/or the apparatus in the network can be assigned to one or multiple network slices, based on NSSAI and/or S-NSSAI and/or UE usage type and/or one or multiple network slice type IDs and/or registration information such as one or multiple NS IDs and/or the APN.

The S-NSSAI in the present embodiment is the abbreviation of Single Network Slice Selection Assistance information and is information for identifying network slices. The S-NSSAI may include Slice/Service type (SST) and Slice Differentiator (SD). The S-NSSAI may include only the SST, or the S-NSSAI may include both the SST and SD.

Here, the SST is information indicating the operation of the network slice expected in terms of function and service. The SD may be information complementary to the SST in a case of selecting one NSI from multiple NSIs indicated by the SST.

The S-NSSAI may be unique information for each PLAIN or may be standard information common between PLMNs. The network may store one or multiple pieces of S-NSSAI in registration information of the UE_A 10 as the default S-NSSAI.

The Single Network Slice Selection Assistance information (NSSAI) in the present embodiment is a group of S-NSSAI. Each S-NSSAI included in the NSSAI is information that assists the access network or the core network to select NSI. The UE_A 10 may store the NSSAI allowed from the network for each PLMN. The NSSAI may be information used to select the AMF_A 240.

The forbidden S-NSSAI list in the present embodiment is a prohibition list in which S-NSSAI prohibited from being used by the network is stored. The forbidden S-NSSAI list may include one or multiple pieces of S-NSSAI. Furthermore, the UE_A 10 may manage the forbidden S-NSSAI list for each PLMN or for each registration area/cell. In other words, the forbidden S-NSSAI list may be associated with the PLMN or may be associated with the registration area/cell.

The forbidden NSSAI list in the present embodiment is a prohibition list in which NSSAI prohibited from being used by the network is stored. The forbidden NSSAI list may include one or multiple pieces of NSSAI. Furthermore, the UE_A 10 may manage forbidden NSSAI list for each PLMN or for each registration area/cell. In other words, the forbidden NSSAI list may be associated with the PLMN or may be associated with the registration area/cell.

The registration attempt counter in the present embodiment is information indicating the number of times the UE_A 10 has attempted the registration procedure. The registration attempt counter may be information indicating the number of times the UE_A 10 has attempted and failed the registration procedure. Note that the registration attempt counter may be managed for each PLMN. Furthermore, the registration attempt counter may be managed separately from registration attempt counter (update) and registration attempt counter (initial) or may be managed as a common value. Note that the registration attempt counter may be managed by the UE_A 10.

The registration attempt counter (initial) in the present embodiment is information indicating the number of times the UE_A 10 has attempted the initial registration procedure. The registration attempt counter (initial) may be information indicating the number of times the UE_A 10 has attempted and failed the initial registration procedure. In other words, the registration attempt counter (initial) may be information indicating the number of times the UE_A 10 in the first state attempts the registration procedure, or may be information indicating the number of times the UE_A 10 has attempted and failed the registration procedure.

The registration attempt counter (update) in the present embodiment is information indicating the number of times the UE_A 10 being registered with the network has attempted the registration procedure again. The registration attempt counter (update) may be information indicating the number of times the UE_A 10 has attempted and failed the registration procedure again. In other words, the registration attempt counter (update) may be information indicating the number of times the UE_A 10 in the second state attempts the registration procedure, or may be information indicating the number of times the UE_A 10 has attempted and failed the registration procedure.

Figure 2A:
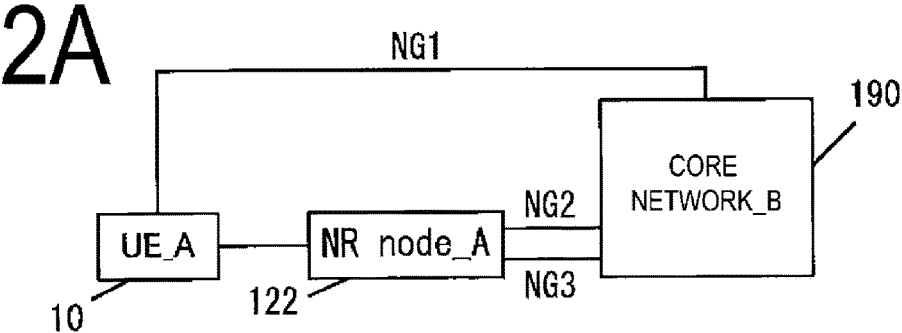
FIGS. 2A to 2E are diagrams for illustrating deployment options of the 5G system.

The configuration of Deployment Option 2 according to the present embodiment is illustrated in FIG. 2A. Deployment option 2 in the present embodiment is a deployment option of NextGen System (NGS) having a stand-alone configuration, and a deployment option by the access network_B using radio access based on New Rat (NR).

In other words, deployment option 2 may be a deployment option of NGS using the access network_B 190 including the NR node A 122. Here, in a case of deployment option 2, RAT used in the access network_B 190 may be NR.

Note that New Rat (NR) may be RAT used in the 5th Generation (5G) system. Furthermore, the NR may be NextGen RA or may be 5th Generation Radio Access (5G RA).

Figure 2B:
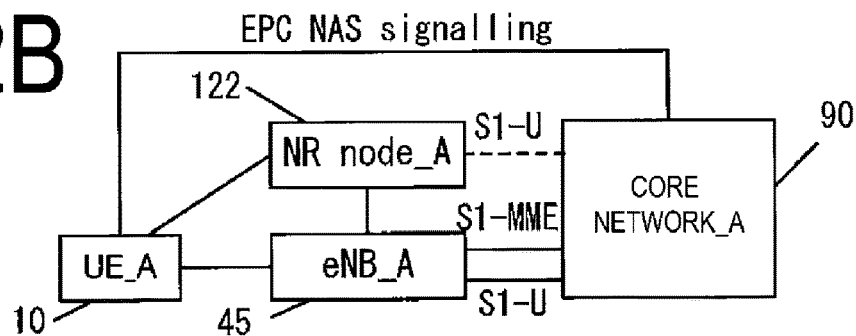

The configuration of Deployment Option 3 according to the present embodiment is illustrated in FIG. 2B. Deployment option 3 in the present embodiment is an EPS deployment option that is not a stand-alone configuration, and is a deployment option by the access network_A 90 using dual connectivity with E-UTRA, which is the anchor RAT, and NR, which is the secondary RAT.

In other words, deployment option 3 may be an EPS deployment option using the access network_A 90 including the eNB_A 45 serving as the anchor node and the NR node_A 122 serving as the secondary node. Here, in a case of deployment option 3, RAT used in the access network_A 90 may be E-UTRA.

Figure 2C:
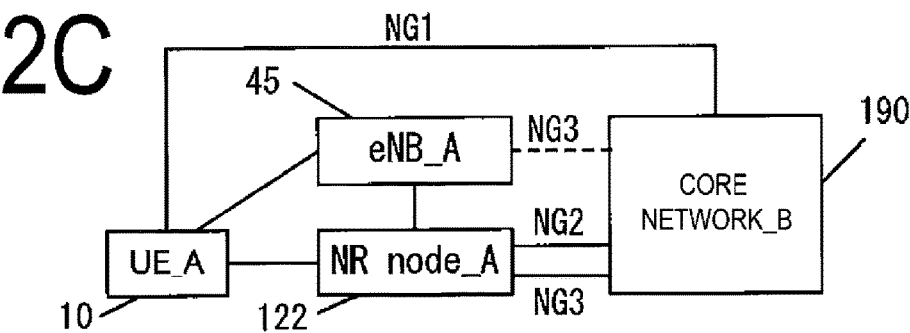

The configuration of Deployment Option 4 according to the present embodiment is illustrated in FIG. 2C. Deployment option 4 in the present embodiment is an NGS deployment option that is not a stand-alone configuration, and is a deployment option by the access network_B 190 using dual connectivity with NR, which is the anchor RAT, and E-UTRA, which is the secondary RAT.

In other words, deployment option 4 may be an NGS deployment option using the access network_B 190 including the NR node_A 122 serving as the anchor node and the eNB_A 45 serving as the secondary node. Here, in a case of deployment option 4, RAT used in the access network_B 190 may be E-UTRA and NR. Furthermore, in the case of deployment option 4, E-UTRA may be an Evolved E-UTRA, and eNB_A 45 may be an Evolved eNB.

Figure 2D:
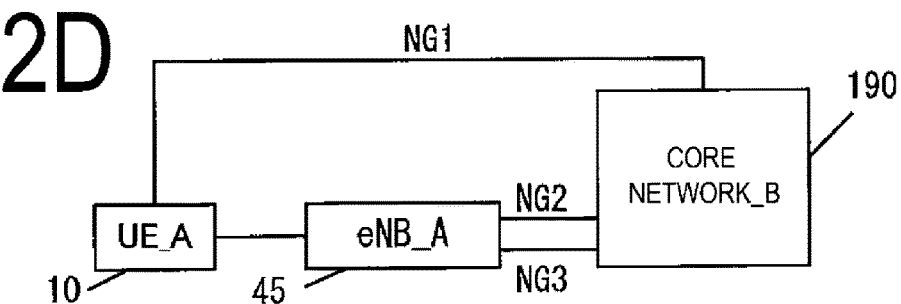

The configuration of Deployment Option 5 according to the present embodiment is illustrated in FIG. 2D. Deployment option 5 according to the present embodiment is an NGS deployment option having a stand-alone configuration and is a deployment option by the access network_B 190 using radio access based on E-UTRA.

In other words, deployment option 5 may be a deployment option of NGS using the access network_B 190 including the eNB_A 45. Here, in a case of deployment option 5, RAT used in the access network_B 190 may be E-UTRA. Furthermore in the case of deployment option 5, E-UTRA may be an Evolved E-UTRA, and the eNB_A 45 may be an Evolved eNB.

Figure 2E:
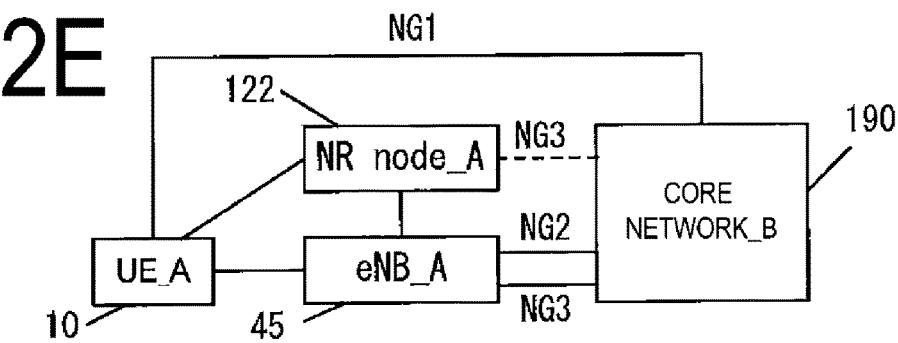

The configuration of Deployment Option 7 according to the present embodiment illustrated in FIG. 2E. Deployment option 7 in the present embodiment is an NGS deployment option that is not a stand-alone configuration, and is a deployment option by the access network_B 190 using dual connectivity with E-UTRA which is the anchor RAT, and NR, which is the secondary RAT.

In other words, deployment option 7 may be an NGS deployment option using the access network_B 190 including the eNB_A 45 serving as the anchor node and the NR node_A 122 serving as the secondary node. Here, in a case of deployment option 7, RAT used in the access network_B 190 may be E-UTRA and NR. Furthermore, in the case of deployment option 7, E-UTRA may be an Evolved E-UTRA, and the eNB_A 45 may be an Evolved eNB.

First behavior in the present embodiment is behavior in which the UE_A 10 transmits a Registration request message that does not include NSSAI transmitted in a previous registration procedure. Specifically, the UE_A 10 may transmit a Registration request message including NSSAI different from the NSSAI transmitted in the previous registration procedure, or may transmit a Registration request message not including NSSAI, or may transmit a Registration request message including empty NSSAI. At this time, in a case that the second timer or the backoff timer of preconfig have already started, the UE_A 10 may transmit a Registration request message after expiration of these timers.

Second behavior in the present embodiment is behavior in which the UE_A 10 does not transmit a Registration request message transmitted in the previous registration procedure to a same Public Land Mobile Network (PLMN). Specifically, the UE_A 10 may transmit a Registration request message including NSSAI which is the same as the NSSAI transmitted in the previous registration procedure to a different PLMN, or may transmit a Registration request message including NSSAI different from the NSSAI transmitted in the previous registration procedure to the same PLMN. In addition, the UE_A 10 may transmit a Registration request message not including NSSAI or including empty NSSAI to the same PLMN. At this time, in the case that the second timer or the backoff timer of preconfig have already started, the UE_A 10 may transmit a Registration request message after expiration of these timers.

Third behavior in the present embodiment is behavior in which the UE_A 10 does not transmit a Registration request message transmitted in a previous registration procedure in a same registration area/cell. Specifically, the UE_A 10 may transmit a Registration request message including NSSAI which is the same as the NSSAI in the previous registration procedure in a different registration area/cell, or may transmit a Registration request message including different NSSAI in the same registration area/cell. In addition, the UE_A 10 may transmit a Registration request message not including NSSAI or including empty NSSAI in the same registration area/cell. Note that in a case of storing mobility restriction, the UE_A 10 may further transmit a Registration request message in consideration of the mobility restriction. At this time, in the case that the second timer or the backoff timer of preconfig have already started, the UE_A 10 may transmit a Registration request message after expiration of these timers.

Fourth behavior in the present embodiment is behavior in which the UE_A 10 transmits a Registration request message transmitted in a previous registration procedure to a same PLMN and/or a same registration area/cell after a certain amount of time has elapsed. Specifically, the UE_A 10 may transmit a Registration request message including NSSAI which is the same as the NSSAI transmitted in the previous registration procedure to a same PLMN and/or a same registration area/cell after a certain amount of time has elapsed. At this time, in the case that the second timer or the backoff timer of preconfig have already started, the UE_A 10 may transmit a Registration request message after expiration of these timers. Note that after the certain amount of time has elapsed may be a time until the second timer expires. Note that after the certain amount of time has elapsed is not limited to this.

Fifth behavior in the present embodiment is behavior in which the UE_A 10 and/or the apparatus in the core network transitions to the first state. Specifically, the UE_A 10 and/or the apparatus in the core network in any one of the second state to the fourth state may transition to the first state. The UE_A 10 and/or the apparatus in the core network which has transitioned to the first state may immediately delete or temporarily maintain the UE context, or may delete after a certain amount of time has elapsed.

Sixth behavior in the present embodiment is behavior in which the UE_A 10 and/or the apparatus in the core network transitions to the second state. Specifically, the UE_A 10 and/or the apparatus in the core network in any one of the third state or the fourth state may transition to the second state. The UE_A 10 and/or the apparatus in the core network which has transitioned to the second state may generate or update the UE context or may continue to hold the UP context that has been generated or updated.

For example, the UE_A 10 and/or the apparatus in the core network which has transitioned from the third state to the second state may generate a UE context, and the UE_A 10 and/or the apparatus in the core network which has transitioned from the fourth state to the second state may update the UE context.

Seventh behavior in the present embodiment is behavior in which the UE_A 10 updates the forbidden NSSAI list or forbidden S-NSSAI list stored in the UE_A 10. Specifically, the UE_A 10 and/or the apparatus in the core network may add NSSAI which the UE_A 10 has transmitted to the network or S-NSSAI included in NSSAI, to the forbidden NSSAI list or forbidden S-NSSAI list.

Eighth behavior in the present embodiment is behavior in which the UE_A 10 and/or the apparatus in the core network resets the forbidden NSSAI list or forbidden S-NSSAI list stored in the UE_A 10 and/or the apparatus. The eighth behavior may be behavior in which the UE_A 10 and/or the apparatus in the core network deletes the UE context being held. Note that the timing at which the UE_A 10 and/or the apparatus in the core network deletes the UE context may be immediately after the eighth behavior has been performed, or after a certain amount of time has elapsed.

Ninth behavior in the present embodiment is behavior in which the UE_A 10 and/or the apparatus in the core network starts the second timer, Note that the value of the timer used in a case that the UE_A 10 and/or the apparatus in the core network starts the second timer may be the value of the second timer transmitted and/or received, or the value of the second timer of preconfig.

10th behavior in the present embodiment is behavior in which the registration attempt counter stored by the UE_A 10 is incremented or reset. Specifically, the UE_A 10 may increase the registration attempt counter to update, or may reset the registration attempt counter in a case that the registration attempt counter reaches a certain value.

Here, the UE_A 10 may separately manage registration attempt counter (update) and registration attempt counter (initial). Specifically, the UE_A 10 that has transmitted the initial Registration request message may increment or reset the registration attempt counter (initial). Alternatively, the UE_A 10 that has transmitted the Registration request message again while the UE_A 10 is once registered with the network may increment or reset the registration attempt counter (update).

In other words, the UE_A 10 in the third state may increment or reset the registration attempt counter (initial), Alternatively, the UE_A 10 in the fourth state may increment or reset the registration attempt counter (update).

11th behavior in the present embodiment is behavior in which the UE_A 10 transmits a De-registration request message to the network. The UE_A 10 may perform the fifth behavior by transmitting the De-registration request message. Note that the Dc-registration request message of the UE_A 10 may be a message transmitted to transition the UE_A 10 to the first state and/or to transition to a state where the UE_A 10 is not registered with the network.

12th behavior in the present embodiment is behavior for updating forbidden RAT list stored by the UE_A 10. Specifically, in a case of performing the 12th behavior, the UE_A 10 may add the current RAT to the forbidden RAT list. Furthermore, the 12th behavior may be behavior for disabling capacity information related to RAT (RAT capability) held by the UE_A 10. Specifically, in a case that the 12th behavior is performed, the UE_A 10 may disable capacity information related to E-UTRA (E-UTRA Capability) or may disable capacity related to NR (NR Capability).

30th behavior in the present embodiment is behavior in which the UE_A 10 and/or the apparatus in the core network transitions to the third state. Specifically, the UE_A 10 and/or the apparatus in the core network in the first state may transition to the third state. The UE_A 10 that has transitioned to the third state may wait for a certain amount of time for a response from the network. The certain amount of time may be managed by the timer. Note that in a case that there is no response of the network even after the certain amount of time has passed, the UE_A 10 may perform the first behavior.

31st behavior in the present embodiment is behavior in which the UE_A 10 and/or the apparatus in the core network transitions to the fourth state. Specifically, the UE_A 10 and/or the apparatus in the core network in the first state may transition to the fourth state. The UE_A 10 that has transitioned to the fourth state may wait for a certain amount of time for a response from the network. The certain amount of time may be managed by the timer. Note that in a case that there is no response of the network even after the certain amount of time has passed, the UE_A 10 may perform the first behavior or the second behavior.

Next, the identification information in the present embodiment will be described. The third identification information in the present embodiment is information indicating NSSAI requested by the UE_A 10. The third information may be NSSAI configured from an HPLMN, may be NSSAI acquired from the AMF_A 240 in the registration procedure, or may be NSSAI allowed from the network. Furthermore, the third identification information may be NSSAI stored for each PLMN.

The fifth identification information in the present embodiment is information indicating whether or not NSSAI other than the NSSAI requested by the UE_A 10 is allowed to be assigned from the network. The fifth identification information may be information indicating whether or not the NSSAI configured with S-NSSAI other than the one or multiple pieces of S-NSSAI constituting the NSSAI requested by the UE_A 10 is allowed to be assigned from the network. Furthermore, the fifth identification information may be information indicating whether or not the NSSAI configured with a part of the one or multiple pieces of S-NSSAI constituting the NSSAI requested by the UE_A 10 is allowed to be assigned from the network.

The sixth identification information in the present embodiment is information indicating a Registration type. The Registration type may be information indicating whether the registration procedure requested by the UE_A 10 is an initial procedure or a procedure other than an initial procedure. More specifically, the Registration type may be information indicating whether the registration procedure requested by the UE_A 10 is an Initial Registration procedure, a periodically occurring registration (Periodic Registration update) procedure, a registration procedure occurred by movement of the UE_A 10 (Mobility Registration update), or a registration procedure that occurs to update the capability information (capability) and/or re-negotiate the protocol parameter. Note that a registration procedure other than the initial registration may be expressed as a registration update procedure. Conversely, the registration update procedure may refer to a registration procedure other than the initial registration procedure.

Note that, in a case that the sixth identification information indicates an initial registration procedure, and/or in a case that the UE_A 10 in the first state has transmitted a Registration request message, and/or in a case that the apparatus in the core network in the first state has received a Registration request message, the UE_A 10 and/or the apparatus in the core network may perform the 30th behavior, based on the transmission and/or reception of the Registration request message. On the other hand, in a case that the sixth identification information indicates other than the initial registration procedure, and/or in a case that the UE_A 10 in the second state has transmitted the Registration request message, and/or in a case that the apparatus in the core network in the second state receives the Registration request message, the UE_A 10 may perform the 31th behavior, based on the transmission and/or reception of the Registration request message.

The 13th identification information in the present embodiment is NSSAI allowed by the network to the UE_A 10. The 13th identification information may be the same information as the third identification information or may be different information. In a case that the Registration request message includes the fifth identification information, the 13th identification information may be the same as the third identification information. More specifically, in a case that the network is allowed to assign NSSAI other than the NSSAI requested by the UE_A 10, based on the fifth identification information included in the Registration request message, the 13th identification information may be NSSAI different from the third identification information. On the other hand, in a case that the network is not allowed to assign NSSAI other than the NSSAI requested by the UE_A 10, based on the fifth identification information included in the Registration request message, the 13th identification information may be NSSAI different from the third identification information.

Note that the UE_A 10 and/or the apparatus in the core network may perform the sixth behavior and/or the 10th behavior, may reset the registration attempt counter, or may perform both behaviors, based on the 13th identification information and/or the transmission and/or reception of the Registration accept message. In a case that the 10th behavior is performed, the UE_A 10 may reset the registration attempt counter (initial) instead of the registration attempt counter, in a case that the UE_A 10 is in the third state. Alternatively, in a case that the UE_A 10 is in the fourth state, the registration attempt counter (update) may be reset instead of the registration attempt counter.

The 14th identification information in the present embodiment is mobility restriction assigned to the UE by the core network. The 14th identification information is information that takes into account in a case that the UE_A 10 performs communication with the network.

The UE_A 10 and/or the apparatus in the core network may perform the sixth behavior and/or the 10th behavior, may reset the registration attempt counter, or may perform both behaviors, based on the 14th identification information and/or the reception of the Registration accept message. In a case that the UE_A 10 is in the third state, the registration attempt counter (initial) may be reset instead of the registration attempt counter. Alternatively, in a case that the UE_A 10 is in the fourth state, the registration attempt counter (update) may be reset instead of the registration attempt counter.

Furthermore, the UE_A 10 may store the received 14th identification information as mobility restriction, based on the reception of the 14th identification information. In a case that the UE_A 10 already stores mobility restriction, the UE_A 10 may update the mobility restriction to the information indicated by the received 14th information, based on the reception of the 14th identification information, Note that the mobility restriction may be stored within the UE context, in which case the mobility restriction may be stored or updated as the sixth behavior.

The 15th identification information in the present embodiment is a cause value (cause) indicating why some of the requests by the UE_A 10 are not allowed and/or some of the requests of the UE_A 10 have been rejected. Specifically, the 15th identification information may be information indicating that NSSAI different from the NSSAI requested by the UE has been assigned to the UE and/or information indicating the reason.

The 15th identification information may be transmitted including the meaning of the 16th identification information and the 17th identification information. The UE_A 10 may perform one or more of the behaviors performed in response to reception of the 16th identification information and the 17th identification information, based on the reception of the 15th identification information.

The 16th identification information the present embodiment is information indicating that NSSAI different from the NSSAI requested by the UE_A 10 has been assigned to the UE. The 16th identification information may be information used to determine whether or not the UE_A 10 performs the registration procedure again.

Based on the reception of the 16th identification information, the UE_A 10 may determine to initiate the registration procedure again and transmit a Registration request message. At this time, in a case that the second timer or the second timer of preconfig has already started, the Registration request message may be transmitted after these timers expire. Alternatively, in a case that a periodic registration procedure is scheduled, the UE_A 10 may transmit a Registration request message as a periodic Registration request message after expiration of a timer that manages a periodic registration procedure.

Based on the reception of the 16th identification information, the UE_A 10 may perform one or more of the seventh behavior, the ninth behavior, the 10th behavior, and the 11th behavior. Note that the UE_A 10 and/or the apparatus in the core network may use the 18th identification information transmitted and/or received as the value of the second timer that starts in the ninth behavior, or may use a value of preconfig.

The 17th identification information in the present embodiment is information indicating whether or not to allow retransmission of the Registration request message including the same NSSAI as the third identification information transmitted and/or received in the Registration request message. The 17th identification information may be information indicating that the Registration request message including the same NSSAI as the third identification information transmitted and/or received in the Registration request message is allowed to be retransmitted, or may be information indicating that it is not allowed. The network may determine the 17th identification information according to a network policy.

Based on the reception of the 17th identification information, the UE_A 10 may determine to initiate the registration procedure again and transmit a Registration request message. At this time, in a case that the second timer or the second timer of preconfig has already started, the Registration request message may be transmitted after these timers expire. Alternatively, in a case that a periodic registration procedure is scheduled, the UE_A 10 may transmit a Registration request message as a periodic Registration request message after expiration of a timer that manages a periodic registration procedure.

In a case that the UE_A 10 transmits a Registration request message to initiate the registration procedure, the Registration request message may be transmitted to the same PLMN, including the NSSAI previously transmitted, in a case of the 17th identification information being allowed. At this time, registration area/cell may be the same as the previous procedure.

Alternatively, in a case that the UE_A 10 transmits the Registration request message to initiate the registration procedure, the Registration request message may be transmitted by behavior of any one of the first behavior to fourth behavior, in a case of the 17th identification information being not allowed.

Based on the reception of the 17th identification information, the UE_A 10 may perform one or more of the seventh behavior, the ninth behavior, the 10th behavior, the 11th behavior, and the 12th behavior. Note that the UE_A 10 and/or the apparatus in the core network may use the 18th identification information transmitted and/or received as the value of the second timer that starts in the ninth behavior, or may use a value of preconfig.

The 18th identification information present embodiment is information indicating a time until the UE_A 10 can initiate a next registration procedure. The 18th information may be a value of the second timer. The UE_A 10 may perform the ninth behavior and/or the 10th behavior, based on the reception of the 18th identification information. Furthermore, the apparatus in the core network may perform the ninth behavior, based on the transmission of the 18th identification information. Note that the UE_A 10 and/or the apparatus in the core network may use the 18th identification information transmitted and/or received as the value of the second timer that starts in the ninth behavior, or may use a value of preconfig.

The 21st identification information in the present embodiment is information indicating the cause value (cause) indicating that the request has been rejected. The 21st identification information may be information indicating that some of the request has been rejected.

The 21st information may be transmitted including the meaning indicated by one or more pieces of the identification information from the 22nd identification information to the 28th identification information. The UE_A 10 may perform one or more of the behaviors performed in response to reception of the 22nd identification information to the 28th identification information, based on the reception of the 21st identification information.

The 22nd identification information in the present embodiment is information indicating that the requested NSSAI is not allowed. The 22nd identification information may be information indicating that the use of the requested NSSAI is prohibited. Furthermore, the 22nd information may be information indicating that the requested NSSAI is not found in the list managed by the network. The 22nd identification information may be information indicating that the use of a service provided by the requested NSSAI is not allowed. Here, the requested NSSAI may be NSSAI indicated by the third identification information. Note that the 22nd identification information may be transmitted including the meaning of the 27th identification information.

Based on the reception of the 22nd identification information, the UE_A 10 may perform one or more behaviors of the first behavior, the fifth behavior, the seventh behavior, the eighth behavior, the ninth behavior, and the 10th behavior. Furthermore, the apparatus in the core network may perform one or more of the fifth behavior, the eighth behavior, and the ninth behavior, based on the transmission of the 22nd identification information. Note that the UE_A 10 and/or the apparatus in the core network may use the 29th identification information transmitted and/or received as the value of the second timer that starts in the ninth behavior, or may use a value of preconfig.

The 23rd identification information in the present embodiment is information indicating that the requested NSSAI is not allowed in the PLMN to which the UE_A 10 is connected. The 23rd identification information may be information indicating that the use of the requested NSSAI is prohibited in the PLMN to which the UE_A 10 is connected. Furthermore, the 23rd information may be information indicating that the requested NSSAI is not found from the PLMN list managed by the network. Furthermore, the 23rd identification information may be information indicating that the use of a service provided by the requested NSSAI is not allowed in the PLMN to which the UE_A 10 is connected.

Based on the reception of the 23rd identification information, the UE_A 10 may perform one or more behaviors of the second behavior, the fifth behavior, the seventh behavior, the eighth behavior, the ninth behavior, and the 10th behavior. Furthermore, the apparatus in the core network may perform one or more of the fifth behavior, the eighth behavior, and the ninth behavior, based on the transmission of the 23rd identification information. Note that the UE_A 10 and/or the apparatus in the core network may use the 29th identification information transmitted and/or received as the value of the second timer that starts in the ninth behavior, or may use a value of preconfig. Furthermore, the UE_A 10 may perform a seventh behavior in a case that the forbidden S-NSSAI list or the forbidden NSSAI list is managed for each PLMN.

The 24th identification information in the present embodiment is information indicating that the requested NSSAI is not allowed in the registration area/cell to which the UE_A 10 is connected. The 24th identification information may be information indicating that the use of the requested NSSAI is prohibited in the registration area/cell to which the UE_A 10 is connected. Furthermore, the 24th information may be information indicating that the requested NSSAI is not found from the registration area/cell list managed by the network. Furthermore, the 24th identification information may be information indicating that the use of a service provided by the requested NSSAI is not allowed in the registration area/cell to which the UE_A 10 is connected.

Based on the reception of the 24th identification information, the UE_A 10 may perform one or more behaviors of the third behavior, the fifth behavior, the seventh behavior, the eighth behavior, the ninth behavior, and the 10th behavior. Furthermore, the apparatus in the core network may perform one or more of the fifth behavior, the eighth behavior, and the ninth behavior, based on the transmission of the 24th identification information. Note that the UE_A 10 and/or the apparatus in the core network may use the 29th identification information transmitted and/or received as the value of the second timer that starts in the ninth behavior, or may use a value of preconfig. Furthermore, the UE_A 10 may perform the seventh behavior in a case that the forbidden S-NSSAI list or the forbidden NSSAI list is managed for each registration area/cell.

The 25th identification information in the present embodiment is information indicating that the requested NSSAI is temporarily not allowed. The 25th identification information may be information indicating that the use of the requested NSSAI is temporarily prohibited. Furthermore, the 25th identification information may be information indicating that a service provided by the requested NSSAI is temporarily not allowed. In a case that the 25th identification information is included in the Registration reject message, the 29th identification information may also be included in the Registration reject message.

Based on the reception of the 25th identification information, the UE_A 10 may perform one or more behaviors of the first behavior, the fourth behavior, the fifth behavior, the sixth behavior, the eighth behavior, the ninth behavior, the 10th behavior, and the 11th behavior. Furthermore, the apparatus in the core network may perform one or more behaviors of the fifth behavior, the sixth behavior, the eighth behavior, and the ninth behavior, based on the transmission of the 25th identification information. Note that the UE_A 10 and/or the apparatus in the core network may use the 29th identification information transmitted and/or received as the value of the second timer that starts in the ninth behavior, or may use a value of preconfig.

Specifically, in a case that the UE_A 10 and/or the apparatus in the core network is in the third state, based on the transmission and/or reception of the 25th identification information, the UE_A 10 and/or the apparatus in the core network may perform the fifth behavior. On the other hand, in a case that the UE_A 10 and/or the apparatus in the core network is in the fourth state, the UE_A 10 and/or the apparatus in the core network may perform the sixth behavior, based on the transmission and/or reception of the 25th identification information. Furthermore, in a case that the UE_A 10 and/or the apparatus in the core network performs the sixth behavior, the UE_A 10 may determine the performance of the 11th behavior, based on the reception of the 25th identification information, and perform the 11th behavior. The UE_A 10 may determine the performance of the 11th behavior, based on the UE policy.

The 26th identification information in the present embodiment may be congestion information (Congestion) indicating that the network is congested.

Based on the reception of the 26th identification information, the UE_A 10 may perform one or more behaviors of the first behavior, the fourth behavior, the fifth behavior, the sixth behavior, the eighth behavior, the ninth behavior, the 10th behavior, and the 11th behavior. Furthermore, the apparatus in the core network may perform one or more behaviors of the fifth behavior, the sixth behavior, the eighth behavior, and the ninth behavior, based on the transmission of the 26th identification information. Note that the UE_A 10 and/or the apparatus in the core network may use the 29th identification information transmitted and/or received as the value of the second timer that starts in the ninth behavior, or may use a value of preconfig.

In a case that the UE_A 10 and/or the apparatus in the core network is in the third state, the UE_A 10 and/or the apparatus in the core network may perform the fifth behavior, based on the transmission and/or reception of the 26th identification information. On the other hand, in a case that the UE_A 10 and/or the apparatus in the core network is in the fourth state, the UE_A 10 and/or the apparatus in the core network may perform the sixth behavior, based on the transmission and/or reception of the 26th identification information. Furthermore, in a case that the UE_A 10 and/or the apparatus in the core network performs the sixth behavior, based on the reception of the 26th identification information, the UE_A 10 may determine the performance of the 11th behavior and perform the 11th behavior. The UE_A 10 may determine the performance of the 11th behavior, based on the UE policy. Furthermore, based on the 11th behavior, the UE_A 10 may perform the fifth behavior, or may transition to a state to wait for a response from the network, based on the 11th behavior.

The 27th identification information in the present embodiment is information indicating the request is not accepted. The 27th information may be information indicating that the requested NSSAI or DNN is not accepted.

The UE_A 10 may perform one or more behaviors of the first behavior, the second behavior, the third behavior, the fifth behavior, the seventh behavior, the ninth behavior, the 10th behavior, based on the reception of the 27th identification information. Furthermore, the apparatus in the core network may perform one or more of the fifth behavior, the eighth behavior, and the ninth behavior, based on the transmission of the 27th identification information. Note that the UE_A 10 and/or the apparatus in the core network may use the 29th identification information transmitted and/or received as the value of the second timer that starts in the ninth behavior, or may use a value of preconfig.

The 28th identification information in the present embodiment is information indicating that the request has been rejected based on Mobility restriction. The 28th identification information may be information indicating the request has been rejected based on RAT restriction.

Furthermore, the 28th identification information may be information indicating that transmission and/or reception of the control message of the UE_A 10 is prohibited in the current RAT of the UE_A 10. Furthermore, the 28th identification information may be information indicating that transmission and/or reception of the control message of the UE_A 10 and transmission and/or reception of the user data are prohibited in the current RAT of the UE_A 10.

In other words, the 28th identification information may be information indicating that transmission and/or reception of a message on C-Plane and/or U-Plane of the UE_A 10 and/or core network_A 10 is prohibited in the current RAT of the UE_A 10, and may indicate that the current RAT of the UE_A 10 is a RAT in which transmission and/or reception of a message on C-Plane and/or U-Plane is prohibited.

Furthermore, the 28th identification information may be information indicating the type of the deployment option of the system to which the UE_A 10 is currently connected. Furthermore, the 28th identification information may be information indicating that transmission and/or reception of a message on C-Plane and/or U-Plane of the UE_A 10 and/or of the core network_A 10 is prohibited in the current RAT of the UE_A 10 due to the type of the deployment option. Furthermore, the 28th identification information may indicate that the current RAT of the UE_A 10 does not match the type of deployment option of the system.

Here, types of deployment options may include deployment option 2, deployment option 3, deployment option 4, deployment option 5, and deployment option 7. Note that the type of the deployment option is not limited to these types.

The UE_A 10 may perform one or more of the fifth behavior, the eighth behavior, the ninth behavior, the 10th behavior, and the 12th behavior, based on the reception of the 28th identification information. Furthermore, the apparatus in the core network may perform one or more of the fifth behavior, the eighth behavior, and the ninth behavior, based on the transmission of the 28th identification information. Note that the UE_A 10 and/or the apparatus in the core network may use the 29th identification information transmitted and/or received as the value of the second timer that starts in the ninth behavior, or may use a value of preconfig.

The 29th identification information in the present embodiment may be the same as the 18th identification information. The UE_A 10 may perform the ninth behavior and/or the 10th behavior, based on the reception of the 29th identification information. Furthermore, the apparatus in the core network may perform the ninth behavior, based on the transmission of the 29th identification information. Note that the UE_A 10 and/or the apparatus in the core network may use the 29th identification information transmitted and/or received as the value of the second timer that starts in the ninth behavior, or may use a value of preconfig.

Figure 14:
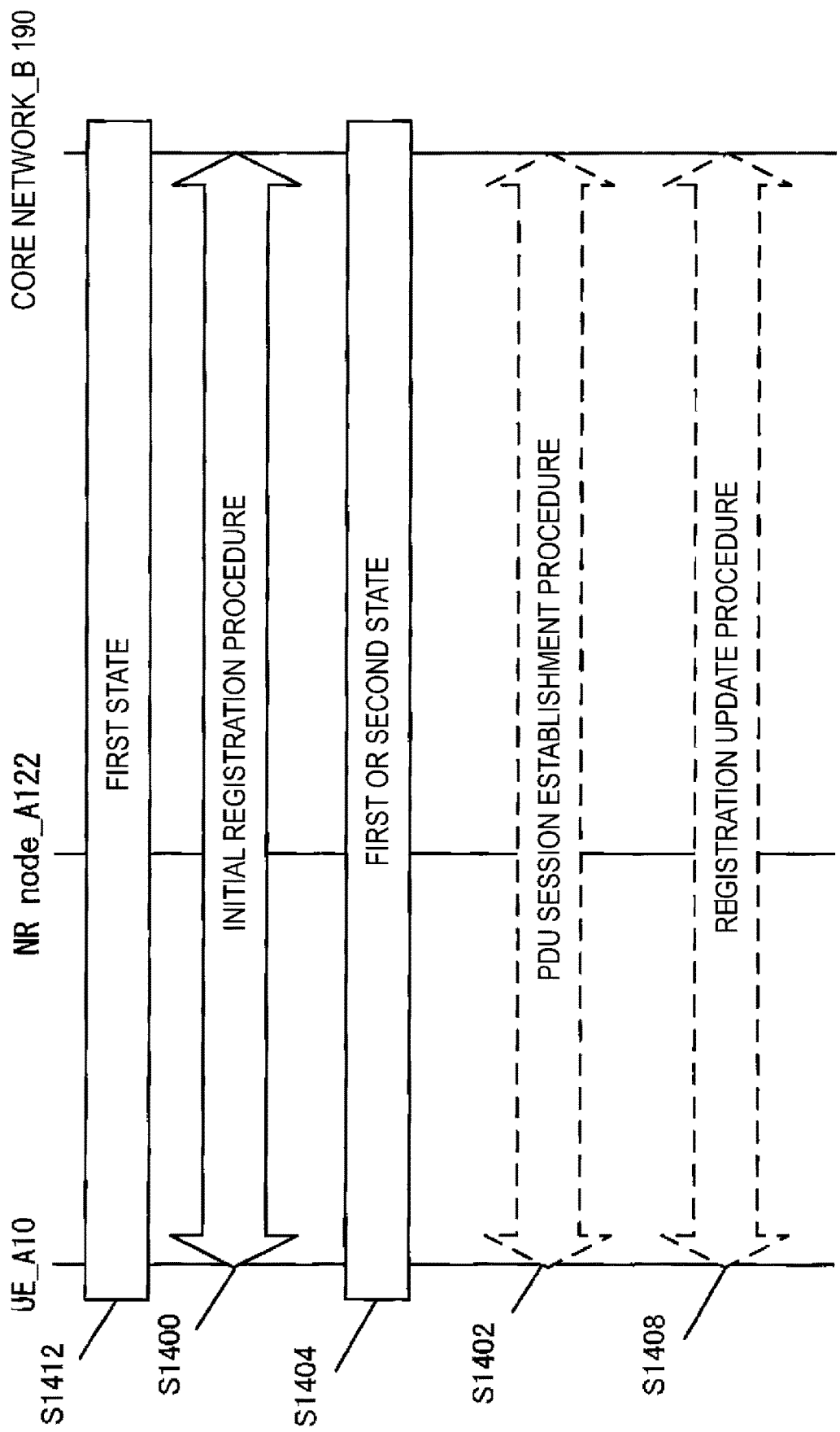
FIG. 14 is a diagram for illustrating an initial procedure and/or update procedure.

Next, an initial procedure and/or update procedure according to the present embodiment will be described with reference to FIG. 14. In the present embodiment, each of the apparatuses may transition to either the first state or the second state, by performing the initial procedure and/or the update procedure. Furthermore, in a case that each of the apparatuses has transitioned to the second state, the UE_A 10 may establish a session through the core network_B 190. Hereinafter, the present procedure refers to the initial procedure and/or update procedure, and each procedure includes a registration procedure and/or a PDU session establishment procedure. Here, the registration procedure may include an initial registration procedure (S1400) and/or a registration update procedure (S1408). Note that the initial registration procedure may be expressed as a registration procedure in an initial stage. Similarly, the registration update procedure may be represented as a registration procedure again. In other words, the initial registration procedure may be a registration procedure initiated by the UE_A 10 in a case that each apparatus is in the first state. Furthermore, the registration update procedure may be a registration procedure initiated by the UE_A 10 in a case that each apparatus is in the second state, and may be a registration procedure other than the initial registration procedure. Details of each procedure will be described below.

In the present procedure, each apparatus in the first state (S1412) at first performs the initial registration procedure (S1400), and enters a state where the UE_A 10 is registered with the network, namely the second state, or to a state where the UE_A 10 is not registered with the network, namely the first state. Then, each apparatus having transitioned to the second state performs the PDU session establishment procedure (S1402), which is a procedure to establish a PDU session, and transitions to either the first state or the second state (S1404). Next, each apparatus in the second state performs a registration update procedure and transitions to either the first state or the second state, based on the completion of the registration update procedure. Note that each apparatus may exchange various types of capability information and/or various types of request information of each apparatus in the registration procedure and/or the PDU session establishment procedure, or may transition to the third state or the fourth state, based on the initiation of the registration procedure.

Note that in a case of having performed exchange of various information and/or negotiation of various request in the registration procedure, each apparatus may not perform exchange of various information and/or negotiation of various request in the PDU session establishment procedure. On the contrary, in a case of not having performed exchange of various information and/or negotiation of various request in the registration procedure, each apparatus may perform exchange of various information and/or negotiation of various request in the PDU session establishment procedure. Not being limited to this, even in a case of having performed exchange of various information and/or negotiation of various request in the registration procedure, each apparatus may perform exchange of various information and/or negotiation of various request in the PDU session establishment procedure.

Each apparatus may perform the PDU session establishment procedure in the registration procedure, or may perform the PDU session establishment procedure after completion of the registration procedure. In a case that the PDU session establishment procedure is performed in the registration procedure, the PDU session establishment request message may be included in the Registration request message and transmitted and/or received, and the PDU session establishment accept message may be included in the Registration accept message and transmitted and/or received, and the PDU session establishment complete message may be included in the Registration complete message and transmitted and/or received, and the PDU session establishment reject message may be included in the Registration reject message and transmitted and/or received. Furthermore, in a case that the PDU session establishment procedure is performed in the registration procedure, each apparatus may establish a PDU session, based on completion of the registration procedure, and may make transition to either the first state or the second state.

By the above-mentioned procedures, each apparatus completes the present procedure. Note that by transmitting and/or receiving each control message described in the present procedure, each apparatus involved in the present procedure may transmit and/or receive one or more pieces of identification information included in each control message, and may store each transmitted and/or received identification information as a context. Furthermore, each apparatus may make transition to either the first state or the second state, based on completion of each procedure.

1.3.1. Overview of Registration Procedure

First, an overview of the registration procedure will be described. The registration procedure is a procedure initiated by the UE_A 10 to connect with a network (an access network, and/or the core network_B 190, and/or the PDN_A 5). The present procedure may include an Initial Registration procedure and/or a Registration update procedure. In addition, the registration update procedure may include a Periodic Registration update and/or registration update based on a mobility of the UE_A 10 (Mobility Registration update), updates of various types of capability information, or registration updates for re-negotiating parameters related to the protocol (protocol parameters).

In a condition of not being connected with the network, the UE_A 10 can perform the initial registration procedure at any timing such as at terminal power activation. In other words, the UE_A 10 may initiate the present procedure at any timing in a case of being not registered to the network (RM-DEREGISTERED), namely the first state. Each apparatus may transition to the third state, based on the initiation of the initial registration procedure, or may transition to the first state or the second state, based on the completion of the initial registration procedure.

Furthermore, the registration update procedure may be a procedure to update location registration information of the UE_A 10 in the network, and/or to periodically notify a state of the UE_A 10 from the UE_A 10 to the network, and/or to update capacity information related to the UE_A 10 in the network and/or particular parameters related to the protocol, in a state where the UE_A 10 is connected to the network, in other words, a registration state with the network (RM-REGISTERED), namely in the second state.

The UE_A 10 may initiate the present procedure in response to mobility over the TA, in a state being connected to the network. In other words, the UE_A 10 may initiate the present procedure in a case of entering a TA different from the TA s indicated by a TA list held. Furthermore, the UE_A 10 may initiate the present procedure in a case that the timer running expires. Furthermore, the UE_A 10 may initiate the present procedure in a case that updating the contexts of each apparatus is required due to disconnection or disabling of the PDU session and/or EPS bearer. Furthermore, the UE_A 10 may initiate the present procedure in a case that a change occurs in the capability information and/or preferences for the PDU session establishment of the UE_A 10. Furthermore, the UE_A 10 may initiate the present procedure periodically. Note that the UE_A 10 can perform a registration update procedure at any timing not limited to these as long as in the second state. Each apparatus may transition to the fourth state, based on the initiation of the registration update procedure, or may transition to the first state or the second state, based on the completion of the registration update procedure.

Furthermore, the present procedure may be initiated and/or performed with the 3GPP access and/or non-3GPP access network.

1.3.1.1. Example of Registration Procedure

Figure 15:
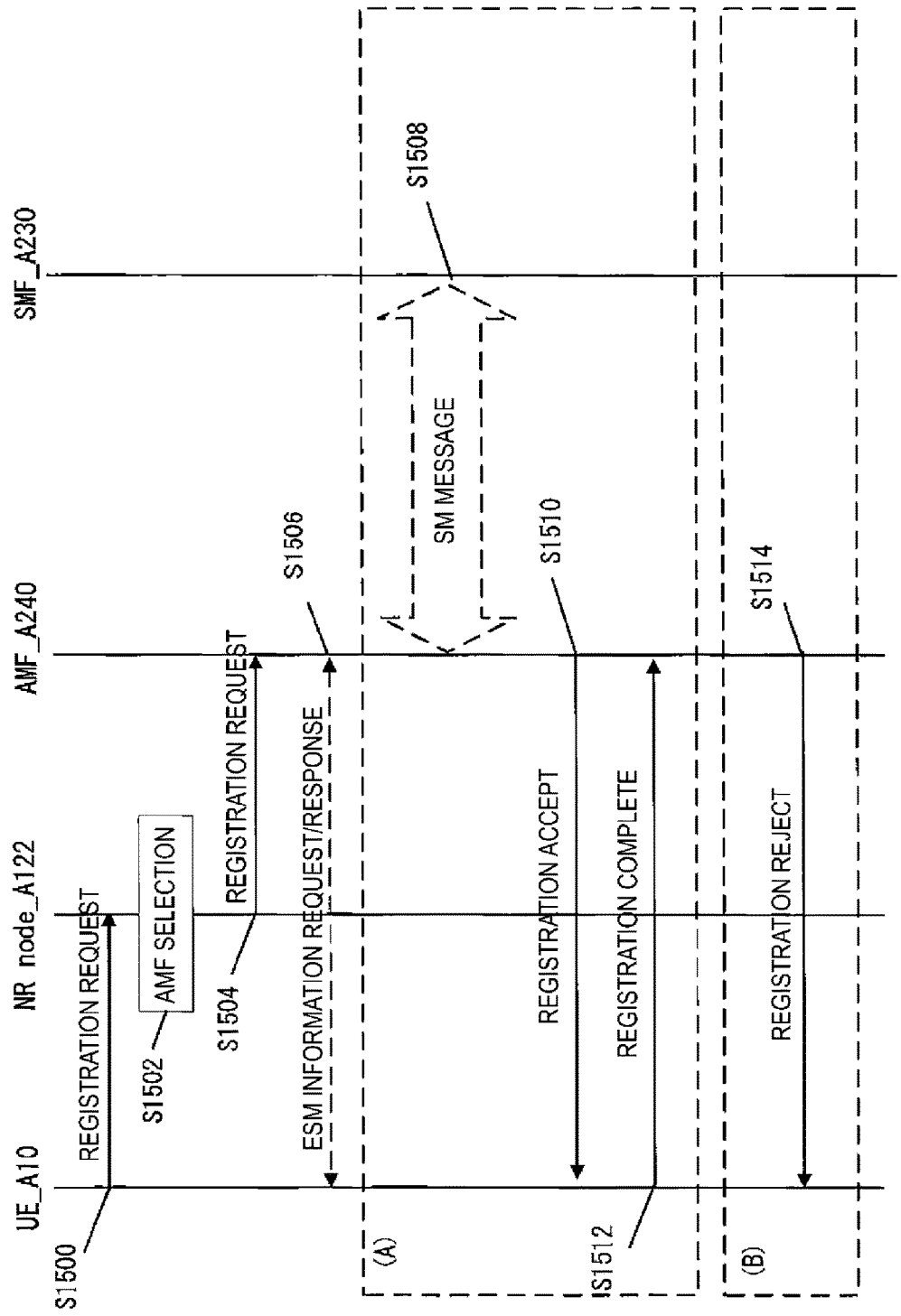
FIG. 15 is a diagram illustrating a registration procedure.

With reference to FIG. 15, an example of procedures to perform the registration procedure will be described. Hereinafter, the present procedure refers to the registration procedure. The present procedure may include an initial registration procedure and/or a registration update procedure, and these procedures may be similar to the present procedure. In other words, the initial registration procedure and/or the registration update procedure may be performed as a registration procedure, or the initial registration procedure and/or the registration update procedure may be represented as a registration procedure.

Hereinafter, the present procedure refers to the registration procedure. As follows, each step of the present procedure will be described. At first, the UE_A 10 transmits a Registration request message to the AMF_A 240 through the NR node_A 122 (S1500) (S1502) (S1504) to initiate the registration procedure. The UE_A 10 may transmit the registration request message including the Session Management (SM) message, or by including the SM message, the UE_A 10 may request performance of the procedure for session management such as the PDU session establishment procedure during the registration procedure.

The UE_A 10 and/or each apparatus may transition to the third state, based on the transmission of the request message in the initial registration procedure, or may transition to the fourth state, based on the transmission of the request message in the registration update procedure.

Specifically, the UE_A 10 transmits a RRC message including the Registration request message to the NR node_A 122 (S1500), and the NR node_A 122 having received the RRC message including the Registration request message selects the AMF_A 240 as the NF or the common CP function of the route destination of the Registration request message (S1502) and transmits the Registration request message to the selected AMF_A 240 (S1504). Here, the NR node_A 122 may select the AMF_A 240 of the routing destination, based on the information included in the RRC message. The Registration request message may be a Non-Access-Stratum (NAS) message transmitted and/or received over the N1 interface. Furthermore, the RRC message may be a control message transmitted and/or received between the UE_A 10 and the NR node_A 122.

Here, the UE_A 10 may include at least one or more of the third identification information, the fifth identification information, and the sixth identification information in the Registration request message and/or the RRC message, and may indicate the request of the UE_A 10 by including these pieces of identification information.

Furthermore, the UE_A 10 may indicate NSSAI requested by the UE_A 10 by transmitting the third identification information. In other words, the UE_A 10 may indicate that, by not transmitting the third identification information, the network allows the NSSAI to be selected or allocated regardless of the request by the UE_A 10. The NSSAI that the network assigns to the UE_A 10 may be a default NSSAI.

Furthermore, by transmitting the fifth identification information, the UE_A 10 may indicate whether or not the UE_A 10 allows NSSAI other than the NSSAI requested by the third identification information, and may indicate whether or not the UE_A 10 allows to be assigned different NSSAI including S-NSSAI constituting the NSSAI requested by the third identification information. The UE_A 10 may transmit the fifth identification information in a case of having transmitted the third identification information.

Furthermore, the UE_A 10 may indicate a type of the registration procedure to be performed, by transmitting the sixth identification information. For example, by transmitting the sixth identification information, the UE_A 10 may indicate performing the initial registration, and may indicate performing the registration update procedure. By transmitting the sixth identification information, the UE_A 10 may determine and indicate performing the initial registration procedure in a case that the UE_A 10 and/or each apparatus is in the first state, or may determine and indicate performing the registration update procedure in a case that the UE_A 10 and/or each apparatus is in the second state.

Note that the UE_A 10 may determine whether or not the third identification information and/or the fifth identification information and/or the sixth identification information is included in the Registration request message, based on the UE_A 10 capability information, and/or policy such as the UE policy, and/or the UE_A 10 preferences. Note that the UE_A 10 determination of whether or not the third identification information and/or the fifth identification information and/or the sixth identification information is included in the Registration request message is not limited to this.

Furthermore, the UE_A 10 may transmit these pieces of identification information included in a control message different from the Registration request message to transmit. For example, the UE_A 10 may transmit these pieces of identification information included in the EPS Session Management (ESM) information response message (S1506), which is a response message to the ESM informational request message.

The AMF_A 240 receives the Registration request message and/or the control message different from the Registration request message, and performs the first condition determination. The first condition determination is intended to determine whether or not the network accepts the request of the UE_A 10. The AMF_A 240 initiates the procedure of (A) in the present procedure in a case that the first condition determination is true, and initiates the procedure of (B) in the present procedure in a case that the first condition determination is false.

As follows, each step of the procedure of (A) in the present procedure will be described. The AMF_A 240 performs the fourth condition determination, and initiates the procedure of (A) in the present procedure. The fourth condition determination is for determining whether or not the AMF_A 240 performs SM message transmission and/or reception with the SMP_A 230. The AMF_A 240 performs selection of the SMF_A 230 and SM message transmission and/or reception to and/or from the selected SMF_A 230 in a case that the fourth condition determination is true, and omits the process in a case that the fourth condition determination is false (S1508). Furthermore, the AMF_A 240 transmits the Registration accept message via the NR node_A 122 to the UE_A 10 (S1510), based on the receipt of the Registration request message and/or completion of SM message transmission and/or reception performed with the SMF_A 230. Here, in a case that the present procedure is performed as the registration update procedure, the Registration accept message may be a registration update accept message. Note that in a case of having received an SM message indicating rejection, the AMF_A 240 may not continue the procedure of (A) in the present procedure, and may initiate the procedure of (B) in the present procedure. Here, the Registration accept message may be included in the control message of the N2 interface and the RRC message and transmitted and/or received. Furthermore, the Registration accept message may be a NAS message transmitted and/or received on the N1 interface. Moreover, the Registration accept message may be a response message to the Registration request message.

Furthermore, based on the identification information included in the Registration accept message, the UE_A 10 may determine a state to which the UE_A 10 transitions after completion of the present procedure, or may determine the behavior after completion of the present procedure, in addition, the UE_A 10 may perform the behavior of the sixth and/or 10th behavior, based on the reception of the Registration accept message and/or one or more pieces of the identification information included in the Registration accept message.

Furthermore, in a case that the fourth condition determination is true, the AMF_A 240 may transmit an SM message such as the PDU session establishment accept message included in the Registration accept message, and may indicate that the session management procedure has been accepted by including the SM message.

Here, the AMF_A 240 may include at least one or more pieces of identification information from the 13th identification information to the 18th identification information in the Registration accept message, and may indicate that the request of the UE_A 10 has been accepted, by including these pieces of identification information.

In addition, the AMF_A 240 transmits the 13th identification information to indicate NSSAI that the network allows and/or assigns to the UE_A 10. Furthermore, the AMF_A 240 may transmit the 13th identification information to indicate that the network supports and/or allows the connection to NSSAI requested by UE_A 10.

Furthermore, the AMF_A 240 may transmit the 14th identification information to indicate the type of mobility restrictions that the network assigned to the UE_A 10. Furthermore, the AMF_A 240 may transmit the 14th identification information to indicate the type of Service area restrictions that the network assigned to the UE_A 10. For example, the AMF_A 240 may transmit the 14th identification information to indicate whether the current registration area of the UE_A 10 is an Allowed area or a Non-allowed area, to indicate that the UE_A 10 may perform the service connection restriction based on the 14th identification information, to indicate storage or updates of mobility restriction, or to indicate performing the 12th behavior.

Furthermore, the AMF_A 240 may indicate the reason why some of the requests the UE_A 10 are rejected or not allowed, by transmitting the 15th identification information. For example, the AMF_A 240 may transmit the 15th identification information to indicate that NSSAI different from the NSSAI required by the UE_A 10 is allocated to the UE_A 10, and may indicate the reason for this.

Furthermore, the AMF_A 240 may transmit the 16th identification information to indicate that NSSAI requested by UE_A 10 is not allowed, and that NSSAI different from the NSSAI requested by the UE_A 10 is allocated to the UE_A 10. Furthermore, the AMF_A 240 may transmit the 17th identification information to indicate whether or not retransmission of the Registration request message including the NSSAI requested by the UE_A 10 is allowed. For example, the AMF_A 240 may transmit the 17th identification information to indicate allowing or not allowing retransmission of the Registration request message including NSSAI requested by the UE_A 10.

In addition, the AMF_A 240 may transmit the 18th identification information to indicate a timer value that is a time until the UE_A 10 can initiate the next registration procedure, or to indicate that the UE_A 10 performs the ninth behavior. Furthermore, the AMF_A 240 may transmit the 13th identification information and/or the 15th identification information and/or the 16th identification information and/or the 17th identification information and/or the 18th identification information to indicate that the NSSAI requested by the UE_A 10 is not allowed, or to indicate that the NSSAI indicated by the 13th identification information is different from the NSSAI requested by the UE_A 10. In a case that the information indicating that the 17th identification information is not allowed, the UE_A 10 may indicate performing the first and/or 11th behavior. In a case that the information indicating that the 17th identification information is allowed, the UE_A 10 may indicate performing the fourth behavior.

Note that the AMF_A 240 may determine which of the identification information from the 13th identification information to the 18th identification information is included in the Registration accept message, based on the received identification information and/or network capability information and/or policies such as the operator policy and/or the network status. Note that the AMF_A 240 determination of which identification information is included in the Registration accept message is not limited to this.

The UE_A 10 receives the Registration accept message and further transmits a Registration complete message to the AMF_A 240 (S1512). Note that in a case of having received an SM message such as the PDU session establishment accept message, the UE_A 10 may transmit an SM message such as the PDU session establishment complete message included in the Registration complete message, and may indicate completing a session management procedure, by including the SM message. Here, the Registration complete message may be a NAS message transmitted and/or received over the N1 interface. The Registration complete message may also be a response message to the Registration accept message. Furthermore, the Registration complete message may be included in the RRC message and the control message of the N2 interface and transmitted and/or received.

The AMF_A 240 receives the Registration complete message. Each apparatus completes the procedure of (A) of the present procedure, based on transmission and/or reception of the Registration accept message and/or Registration complete message.

Furthermore, the UE_A 10 and/or each apparatus may transition to the second state, based on the completion of the procedure (A) during the present procedure.

Each step of the procedure of (B) in the present procedure will now be described. The AMF_A 240 transmits a Registration reject message to the UE_A 10 through the NR node_A 122 (S1514), and initiates the procedure of (B) in the present procedure. Here, in a case that the present procedure is performed as the registration update procedure, the Registration reject message may be a registration update reject message. Furthermore, the UE_A 10 receives the Registration reject message, and recognizes that the request of the UE_A 10 has been rejected. Each apparatus completes the procedure of (B) in the present procedure, based on transmission and/or reception of the Registration reject message.

Furthermore, the UE_A 10 and/or each apparatus may transition to first state or the second state, based on the completion of the procedure (B) during the present procedure. Furthermore, based on the identification information included in the Registration reject message, the UE_A 10 may determine a state to which the UE_A 10 transitions after completion of the present procedure, or may determine the behavior after completion of the present procedure. In addition, the UE_A 10 may perform the behavior of the sixth and/or 10th behavior, based on the reception of the Registration reject message and/or one or more pieces of the identification information included in the Registration reject message. Furthermore, in a case that the UE_A 10 receives the Registration reject message in the third state, the UE_A 10 that receives one or more pieces of identification information included in the Registration reject message may perform the fifth behavior.

Note that, in a case that the fourth condition determination is true, the AMF_A 240 may transmit an SM message meaning rejection such as the PDU session establishment reject message included in the Registration reject message, and may indicate that the session management procedure has been rejected by including the SM message meaning rejection. In that case, in addition, the UE_A 10 may receive an SM message meaning rejection such as the PDU session establishment reject message, or may authenticate that a session management procedure has been rejected.

Furthermore, the Registration reject message may be a NAS message transmitted and/or received over the N1 interface. The Registration reject message may be a response message to the Registration request message but not limited to this, and may be a message to reject the request of the UE_A 10. Furthermore, the Registration reject message may be included in the control message of the N2 interface and the RRC message and transmitted and/or received.

The AMF_A 240 may include at least one or more pieces of identification information from the 21st identification information to the 29th identification information in the Registration reject message, and may indicate that the request of the UE_A 10 has been rejected, by including these pieces of identification information.

Furthermore, the AMF_A 240 may indicate the reason why the present procedure is rejected, and may indicate that some of the requests of the UE_A 10 is rejected, by transmitting the 21st identification information.

Furthermore, the AMF_A 240 may transmit the 22nd identification information to indicate that the NSSAI requested by the UE_A 10 is not allowed, to indicate the NSSAI requested by the UE_A 10 cannot be found in a list managed by the network, or to indicate that the use of a service provided by the NSSAI requested by the UE_A 10 is not allowed.

Furthermore, the AMF_A 240 may transmit the 23rd identification information to indicate that the NSSAI requested by the UE_A 10 is not allowed in the PLMN, to indicate the NSSAI requested by the UE_A 10 cannot be found in a list for each PLMN managed by the network, or to indicate that the use of a service provided by the NSSAI requested by the UE_A 10 is not allowed in the PLMN.

Furthermore, the AMF_A 240 may transmit the 24th identification information to indicate that the NSSAI requested by the UE_A 10 is not allowed in the registration area/cell, to indicate the NSSAI requested by the UE_A 10 cannot be found in a list managed by the network, or to indicate that the use of a service provided by the NSSAI requested by the UE_A 10 is not allowed in the registration area/cell.

Furthermore, the AMF_A 240 may transmit the 25th identification information to indicate that the NSSAI requested by the UE_A 10 is temporarily not allowed, or to indicate that the use of a service provided by the NSSAI requested by the UE_A 10 is temporarily not allowed. Furthermore, the AMF_A 240 may transmit the 26th identification information to indicate the network is congested. Furthermore, the AMF_A 240 may transmit the 27th identification information to indicate that the request by the UE_A 10 is not allowed, or to indicate that the NSSAI and/or DNN and the like requested by the UE_A 10 is not allowed.

Furthermore, the AMF_A 240 may transmit the 28th identification information to indicate that the present procedure for the UE_A 10 has been rejected based on Mobility restriction and/or RAT restriction, or indicate that the transmission and/or reception of the control message and/or the user data in the current RAT of the UE_A 10 is prohibited. In addition, the type of deployment option of the system to which the UE_A 10 is currently connected may be indicated. Specifically, it may be indicated that the type of deployment option of the system to which the UE_A 10 is currently connected is either deployment option 2, deployment option 3, deployment option 4, deployment option 5, or deployment option 7.

In addition, the AMF_A 240 may transmit the 29th identification information to indicate a timer value that is a time until the UE_A 10 can initiate the next registration procedure, or to indicate that the UE_A 10 performs the ninth behavior.

Furthermore, the AMF_A 240 may transmit one or more pieces of identification information from the 21st identification information to the 27th identification information to indicate that the NSSAI requested by the UE_A 10 is not allowed, or to indicate the reason why the NSSAI requested by the UE_A 10 is not allowed.

Furthermore, the AMF_A 240 may indicate that the UE_A 10 performs the first behavior, by transmitting the 21st identification information and/or the 22nd identification information. Furthermore, the AMF_A 240 may indicate that the UE_A 10 performs the second behavior, by transmitting the 21st identification information and/or the 23rd identification information and/or the 27th identification information. Furthermore, the AMF_A 240 may indicate that the UE_A 10 performs the third behavior, by transmitting the 21st identification information and/or the 24th identification information. Furthermore, the AMF_A 240 may indicate that the UE_A 10 performs the fourth behavior, by transmitting the 21st identification information and/or the 25th identification information.

Furthermore, the AMF_A 240 may indicate that the UE_A 10 performs the fourth behavior, by transmitting the 27th identification information and/or the 29th identification information. Furthermore, the AMF_A 240 may indicate that the UE_A 10 performs the fifth behavior, by transmitting the 21st identification information and/or the 22nd identification information and/or the 23rd identification information and/or the 24th identification information and/or the 27th identification information and/or the 28th identification information to the UE_A 10 in the fourth state. Furthermore, the AMF_A 240 may indicate that the UE_A 10 performs the sixth behavior, by transmitting the 21st identification information and/or the 25th identification information and/or the 26th identification information to the UE_A 10 in the fourth state. Furthermore, the AMF_A 240 may indicate that the UE_A 10 performs the seventh behavior and/or the eighth behavior, by transmitting the 21st identification information and/or the 22nd identification information and/or the 23rd identification information and/or the 24th identification information and/or the 27th identification information and/or the 28th identification information. Furthermore, the AMF_A 240 may indicate that the UE_A 10 performs the 12th behavior, by transmitting the 21st identification information and/or the 28th identification information.

Note that the AMF_A 240 may determine which of identification information from the 21st identification information to the 29th identification information is included in the Registration reject message, based on the received identification information and/or network capability information and/or policies such as the operator policy and/or the network status. Note that the AMF_A 240 determination of which identification information is included in the Registration reject message is not limited to this.

Each apparatus completes the present procedure, based on completion of the procedures of (A) or (B) of the present procedure. Note that each apparatus may transition to the second state as for the UE_A 10, based on completion of the procedure of (A) in the present procedure, may recognize that the present procedure has been rejected, based on completion of the procedure of (B) in the present procedure, may transition to the first state in a case of the initial registration procedure, or may transition to the first state or the second state in a case of the registration update procedure. Transition to each state of each apparatus may be performed based on completion of the present procedure, may be performed based on initiation of the present procedure, or may be performed based on an establishment of a PDU session.

Furthermore, each apparatus may perform processes based on identification information transmitted and/or received in the present procedure, based on completion of the present procedure. For example, based on the 13th identification information, the UE_A 10 may recognize that the NSSAI requested by the UE_A 10 is allowed, or may recognize that the NSSAI indicated by the 13th identification information is the same NSSAI requested by the UE_A 10.

Alternatively, based on the 13th identification information and/or the 15th identification information and/or the 16th identification information and/or the 17th identification information, the UE_A 10 may recognize that the NSSAI requested by the UE_A 10 is not allowed, or may recognize that the NSSAI indicated by the 13th identification information is different from the NSSAI requested by the UE_A 10. Furthermore, the UE_A 10 may perform the first behavior or may perform the 11th behavior, based on the reception of the 13th identification information and/or the 15th identification information and/or the 16th identification information and/or the 17th identification information indicating not allowing. Alternatively, the UE_A 10 may perform the fourth behavior, based on the reception of the 13th identification information and/or the 15th identification information and/or the 16th identification information and/or the 17th identification information indicating allowing, and/or the 18th identification information.

In addition, based on the reception of the 14th identification information, the UE_A 10 may recognize the type of Service area restrictions in the current registration area of the UE_A 10. Specifically, based on the reception of the 14th identification information, the UE_A 10 may recognize whether the current registration area of the UE_A 10 is an Allowed area or a Non-allowed area.

Furthermore, the UE_A 10 may perform the first behavior, based on the reception of the 13th identification information and/or the 15th identification information and/or the 16th identification information and/or the 17th identification information indicating not allowing.

Furthermore, the UE_A 10 may perform the fourth behavior, based on the reception of the 13th identification information and/or the 15th identification information and/or the 16th identification information and/or the 17th identification information indicating allowing, and/or the 18th identification information.

In addition, the UE_A 10 may perform the sixth behavior, based on the reception of the Registration accept message. Furthermore, the UE_A 10 may perform the ninth behavior, based on the reception of the 18th identification information. In addition, the UE_A 10 may perform the 10th behavior, based on the reception of the Registration accept message.

Furthermore, the UE_A 10 may perform the 11th behavior, based on the 13th identification information and/or the 15th identification information and/or the 16th identification information and/or the 17th identification information indicating not allowing. Furthermore, the UE_A 10 may perform the 12th behavior, based on the reception of the 14th identification information.

Furthermore, based on the reception of one or more pieces of identification information from the 21st identification information to the 27th identification information, the UE_A 10 may recognize that the NSSAI requested by the UE_A 10 is not allowed, or may recognize why the NSSAI requested by the UE_A 10 is not allowed.

Furthermore, based on the reception of the 28th identification information, the UE_A 10 may recognize that the transmission and/or reception of the control message and/or the user data in the current RAT of UE_A 10 is prohibited, or may recognize the type of deployment option of the system to which the UE_A 10 is currently connected. Specifically, based on the reception of the 28th identification information, the UE_A 10 may recognize that the type of deployment option of the system to which the UE_A 10 is currently connected is either deployment option 2, deployment option 3, deployment option 4, deployment option 5, or deployment option 7.

Furthermore, the UE_A 10 may perform the first behavior, based on the reception of the 21st identification information and/or the 22nd identification information. Furthermore, the UE_A 10 may perform the second behavior, based on the reception of the 21st identification information and/or the 23rd identification information and/or the 27th identification information.

Furthermore, the UE_A 10 may perform the third behavior, based on the reception of the 21st identification information and/or the 24th identification information. The UE_A 10 may perform the fourth behavior, based on the reception of the 21st identification information and/or the 25th identification information and/or the 27th identification information and/or the 29th identification information.

In addition, in a case that each apparatus is in the third state, the UE_A 10 may perform the fifth behavior, based on the reception of the Registration reject message. Furthermore, in a case that each apparatus is in the fourth state, the UE_A 10 may perform the fifth behavior, based on the reception of the 21st identification information and/or the 22nd identification information and/or the 23rd identification information and/or the 24th identification information and/or the 27th identification information and/or the 28th identification information.

Furthermore, in a case that each apparatus is in the fourth state, the UE_A 10 may perform the sixth behavior, based on the reception of the 21st identification information and/or the 25th identification information and/or the 26th identification information. Furthermore, the UE_A 10 may perform the seventh behavior, based on the reception of the 21st identification information and/or the 22nd identification information and/or the 23rd identification information and/or the 24th identification information and/or the 27th identification information and/or the 28th identification information.

Furthermore, the UE_A 10 may perform the eighth behavior, based on the reception of the 21st identification information and/or the 22nd identification information and/or the 23rd identification information and/or the 24th identification information and/or the 27th identification information and/or the 28th identification information. Furthermore, the UE_A 10 may perform the ninth behavior, based on the reception of the 29th identification information.

In addition, the UE_A 10 may perform the 10th behavior, based on the reception of the Registration reject message. Furthermore, the UE_A 10 may perform the 12th behavior, based on the reception of the 21st identification information and/or the 28th identification information.

Furthermore, in a case that each apparatus has transitioned to the second state, each apparatus may perform a PDU session establishment procedure. Specifically, for example, the UE_A 10 may perform a PDU session establishment procedure based on the NSSAI assigned from the network. Alternatively, in a case that each apparatus has transitioned to the second state, each apparatus may perform a de-registration procedure. Alternatively, in a case that each apparatus has transitioned to the second state, the registration update procedure may be performed.

The first condition determination may be performed based on identification information, and/or subscriber information, and/or operator policies included in the Registration request message. For example, in a case that the network allows the request of the UE_A 10, the first condition determination may be true. In a case that the network does not allow the request of the UE_A 10, the first condition determination may be false. Furthermore, the first condition determination may be true in a case that the network to which the UE_A 10 is connected and/or an apparatus in the network supports functions requested by the UE_A 10, or may be false in a case that the network and/or the apparatus does not support functions requested by the UE_A 10. Note that conditions that true or false of the first condition determination is determined may not be limited to the previously described conditions.

The fourth condition determination may be performed, based on whether or not the AMF_A 240 has received an SM message, or may be performed, based on whether or not an SM message is included in the Registration request. For example, the fourth condition determination may be true in a case that the AMF_A 240 received an SM message and/or an SM message is included in the Registration request, and may be false in a case that the AMF_A 240 has not received an SM message and/or an SM message is not included in the Registration request. Note that conditions that true or false of the fourth condition determination is determined may not be limited to the previously described conditions.

2. Modifications

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory, such as a Random Access Memory (RAM), a non-volatile memory, such as a flash memory, a Hard Disk Drive (HDD), or another storage apparatus system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining a program for a short time, or any other computer-readable recording medium.

Furthermore, each functional block or various characteristics of the apparatuses used in the above-described embodiment may be implemented or performed in an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine instead. The above-mentioned electric circuit may be constituted of a digital circuit or an analog circuit. Furthermore, in a case that with advances in semiconductor technology, a circuit integration technology appears that replaces the present integrated circuits, one or multiple aspects of the present invention can also use a new integrated circuit based on the technology.

Note that the present invention of the present patent application is not limited to the above-described embodiment. In the embodiment, apparatuses have been described as an example, but the present invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 PDN_A
10 UE_A
30 PGW_A
35 SGW_A
40 MME_A
42 SGSN_A
45 eNB_A
46 SCEF_A
50 HSS_A
60 PCRF_A
80 E-UTRAN_A
105 DN_B
120 NextGen RAN_A
122 NR node_A
123 NR node_B
125 WLAN ANc
126 WAG_A
130 UPGW_A
140 CPF_A
190 Core network_B
230 SMF_A
235 UPF_A
240 AMP_A

The invention claimed is:

1. A User Equipment (UE) comprising:
receiving circuitry configured to:
   receive first identification information or second identification information from an Access and Mobility Management Function (AMF), and
control circuitry configured to:
   add a Single Network Slice Selection Assistance Information (S-NSSAI) in a first set of S-NSSAIs in a case that the first identification information is received, and
   add the S-NSSAI in a second set of S-NSSAIs in a case that the second identification information is received,
wherein,
the first identification information indicates that the S-NSSAI is not available in a current Public Land Mobile Network (PLMN),
the second identification information indicates that the S-NSSAI is not available in a current registration area,
the first set of S-NSSAIs is comprised of S-NSSAIs which are associated with the first identification information and are not used in the current PLMN, and
the second set of S-NSSAIs is comprised of S-NSSAIs which are associated with the second identification information and are not used in the current registration area.

2. A communication method performed by a User Equipment (UE), the communication method comprising:
receiving first identification information or second identification information from an Access and Mobility Management Function (AMF),
adding a Single Network Slice Selection Assistance Information (S-NSSAI) in a first set of S-NSSAIs in a case that the first identification information is received, and
adding the S-NSSAI in a second set of S-NSSAIs in a case that the second identification information is received,
wherein,
the first identification information indicates that the S-NSSAI is not available in a current Public Land Mobile Network (PLMN),
the second identification information indicates that the S-NSSAI is not available in a current registration area,
the first set of S-NSSAIs is comprised of S-NSSAIs which are associated with the first identification information and are not used in the current PLMN, and
the second set of S-NSSAIs is comprised of S-NSSAIs which are associated with the second identification information and are not used in the current registration area.

3. The UE according to claim 1, wherein
the first identification information is information indicating a rejection cause for the current PLMN, and
the second identification information is information indicating a rejection cause for the current registration area.

4. The communication method according to claim 2, wherein
   the first identification information is information indicating a rejection cause for the current PLMN, and
   the second identification information is information indicating a rejection cause for the current registration area.

* * * * *